(12) United States Patent
Stanfill et al.

(10) Patent No.: US 9,747,112 B2
(45) Date of Patent: Aug. 29, 2017

(54) MANAGING INVOCATION OF TASKS

(71) Applicant: Ab Initio Technology LLC, Lexington, MA (US)

(72) Inventors: Craig W. Stanfill, Lincoln, MA (US); Richard Shapiro, Arlington, MA (US); Stephen A. Kukolich, Lexington, MA (US); Joseph Skeffington Wholey, III, Belmont, MA (US)

(73) Assignee: Ab Initio Technology, LLC, Lexington, MA (US)

( * ) Notice: Subject to any disclaimer, the term of this patent is extended or adjusted under 35 U.S.C. 154(b) by 0 days.

(21) Appl. No.: 14/843,001

(22) Filed: Sep. 2, 2015

(65) Prior Publication Data
US 2016/0062799 A1    Mar. 3, 2016

Related U.S. Application Data

(60) Provisional application No. 62/044,665, filed on Sep. 2, 2014, provisional application No. 62/164,175, filed on May 20, 2015.

(51) Int. Cl.
| | |
|---|---|
| *G06F 9/46* | (2006.01) |
| *G06F 9/44* | (2006.01) |
| *G06F 9/48* | (2006.01) |

(52) U.S. Cl.
CPC .................. *G06F 9/44* (2013.01); *G06F 8/34* (2013.01); *G06F 9/4421* (2013.01);
(Continued)

(58) Field of Classification Search
None
See application file for complete search history.

(56) References Cited

U.S. PATENT DOCUMENTS

| | | |
|---|---|---|
| 5,966,072 A | 10/1999 | Stanfill et al. |
| 7,051,189 B2 * | 5/2006 | Warnes ............... G06F 9/30156 712/210 |
| 7,234,140 B2 * | 6/2007 | Dortmans .............. G06Q 10/06 707/999.004 |
| 7,506,304 B2 | 3/2009 | Morrow et al. |
| 7,870,556 B2 | 1/2011 | Wholey, III et al. |
| (Continued) | | |

FOREIGN PATENT DOCUMENTS

EP    1559069    8/2005

OTHER PUBLICATIONS

Johnston, Wesley M. et al: "Advances in dataflow programming languages", ACM Computing Surveys, ACM, New York, NY, US, vol. 36, No. 1, Mar. 2004 (Mar. 2004), pp. 1-34.

(Continued)

*Primary Examiner* — Charles Swift
(74) *Attorney, Agent, or Firm* — Occhiuti & Rohlicek LLP

(57) ABSTRACT

A graph-based program specification includes components, at least one having at least one input port for receiving a collection of data elements, or at least one collection type output port for providing a collection of data elements. Executing a program specified by the graph-based program specification at a computing node, includes: receiving data elements of a first collection into a first storage in a first order via a link connected to a collection type output port of a first component and an input port of a second component, and invoking a plurality of instances of a task corresponding to the second component to process data elements of the first collection, including retrieving the data elements from the first storage in a second order, without blocking invocation of any of the instances until after any particular instance completes processing one or more data elements.

46 Claims, 16 Drawing Sheets

(52) U.S. Cl.
CPC .......... *G06F 9/4423* (2013.01); *G06F 9/4436* (2013.01); *G06F 9/46* (2013.01); *G06F 9/465* (2013.01); *G06F 9/466* (2013.01); *G06F 9/4843* (2013.01); *G06F 9/4881* (2013.01)

(56) References Cited

U.S. PATENT DOCUMENTS

| | | | |
|---|---|---|---|
| 2001/0042224 A1* | 11/2001 | Stanfill | G06F 11/1458 714/16 |
| 2003/0088755 A1 | 5/2003 | Gudmunson et al. | |
| 2005/0034112 A1* | 2/2005 | Stanfill | G06F 8/45 717/149 |
| 2008/0133209 A1 | 6/2008 | Bar-Or et al. | |
| 2008/0244594 A1* | 10/2008 | Chen | G06F 8/34 718/104 |
| 2010/0211953 A1 | 8/2010 | Wakeling et al. | |
| 2011/0016354 A1* | 1/2011 | Douros | G06F 11/1438 714/16 |
| 2011/0161917 A1* | 6/2011 | Thomson | G06F 8/34 717/105 |
| 2013/0339977 A1 | 12/2013 | Dennis et al. | |
| 2014/0053129 A1 | 2/2014 | Von Platen et al. | |
| 2016/0062749 A1 | 3/2016 | Stanfill et al. | |

OTHER PUBLICATIONS

International Search Report and Written Opinion, International Application No. PCT/US2015/048069, mailed Jan. 21, 2016 (15 pages).

Bhattacharyya et al., "Memory Managmeent for Dataflow Programming of Mutirate Signal Processing Algorithms," IEEE Transactions on Signal Processing, 42 May 1994, No. 5.

Blumofe, Robert D. and Philip A Lisiecki, "Adaptive and Reliable Parallel Computing on Nework Workstations," *Proceedings of the USENIX 1997 Annual Technical Symposium*, Anaheim, California, Jan. 6-10, 1997 (15 pages).

Blumofe et al., "Cilk: An Efficient Multithread Runtime System," The Journal of Parallel and Distributed Computing, 37(1):55-69, Aug. 25, 1996. (26 pages).

Blumofe et al., "Cilk: An Efficient Multithread Runtime System," Proceedings of the Fifth ACM SIGPLAN Symposium on Principles and Practice of Parallel Programming (PPoPP '95), Santa Barbara California, Jul. 19-21, 1995 (11 pages).

Murray et al., "CIEL: a universal execution engine for distributed data-flow computing" Proceedings of the 8th USENIX conference on Networked systems design and implementation, pp. 113-126, Mar. 30, 2011.

Akidau et al., "MillWheel: Fault-Tolerant Stream Processing at Internet Scale," The 39th International Conference on Very Large Data Bases, Aug. 26-30, 2013, Riva del Garda, Trento, Italy, Proceedings of the VLDB Endowment, vol. 6, No. 11 (12 pages).

Chambers et al., "FlumeJava: Easy, Efficient Data-Parallel Pipelines," PLDI'10, Jun. 5-10, 2010, Toronto, Ontario, Canada (13 pages).

* cited by examiner

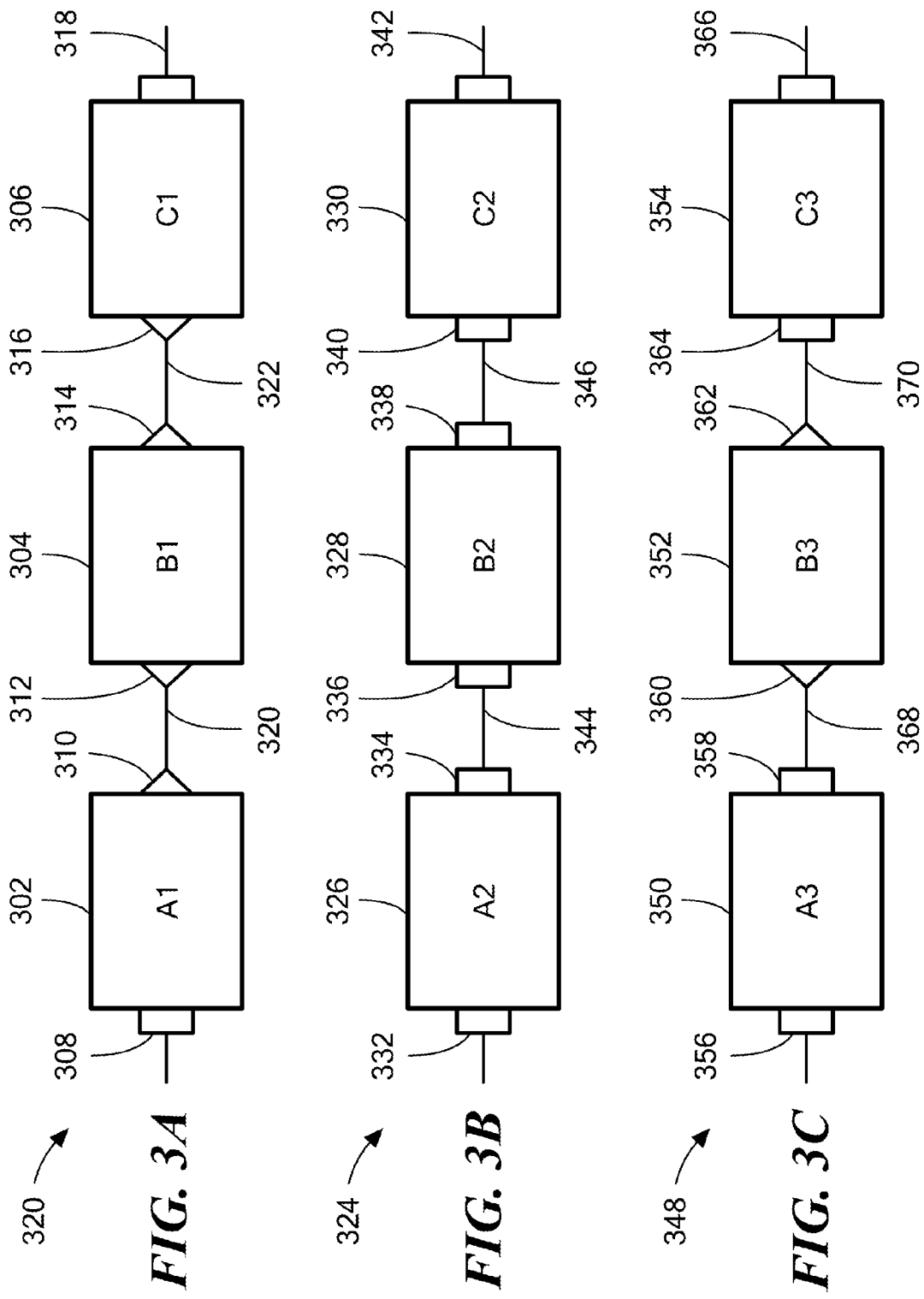

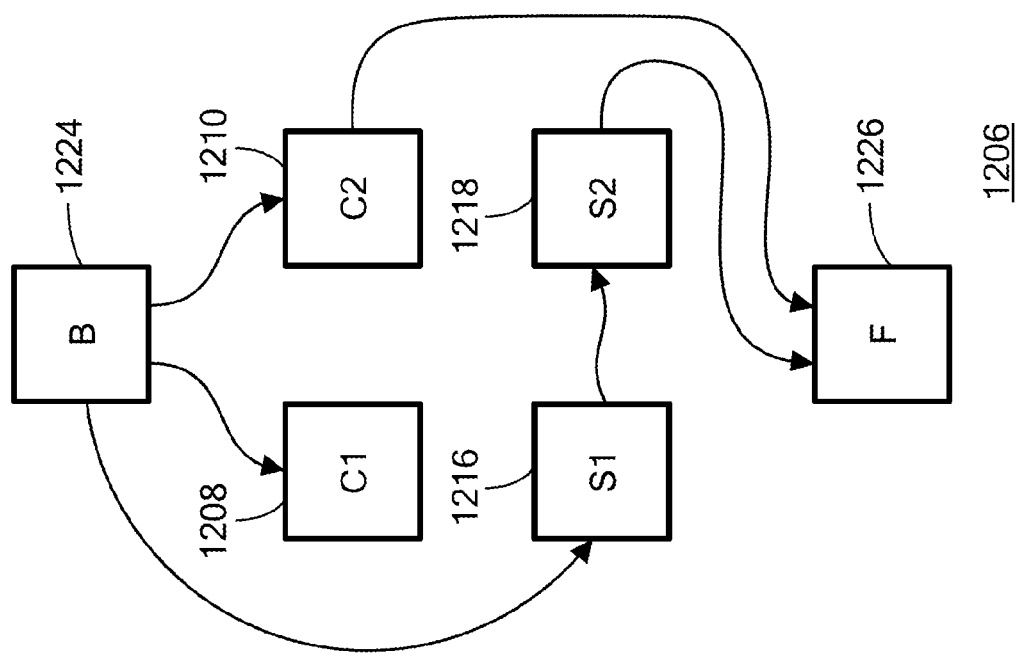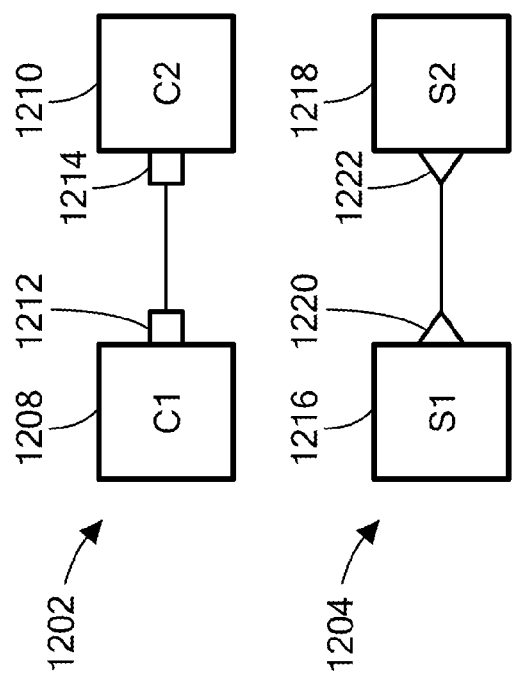
FIG. 12A

MANAGING INVOCATION OF TASKS

CROSS-REFERENCE TO RELATED APPLICATIONS

This application claims priority to U.S. Application Ser. No. 62/044,665, filed on Sep. 2, 2014, and U.S. Application Ser. No. 62/164,175, filed on May 20, 2015, each of which is incorporated herein by reference.

BACKGROUND

This description relates to an approach to managing invocation of tasks.

One approach to data flow computation makes use of a graph-based representation in which computational components corresponding to nodes (vertices) of a graph are coupled by data flows corresponding to links (directed edges) of the graph (called a "dataflow graph"). A downstream component connected to an upstream component by a data flow link receives an ordered stream of input data elements, and processes the input data elements in the received order, optionally generating one or more corresponding flows of output data elements. A system for executing such graph-based computations is described in prior U.S. Pat. No. 5,966,072, titled "EXECUTING COMPUTATIONS EXPRESSED AS GRAPHS," incorporated herein by reference. In an implementation related to the approach described in that prior patent, each component is implemented as a process that is hosted on one of typically multiple computer servers. Each computer server may have multiple such component processes active at any one time, and an operating system (e.g., Unix) scheduler shares resources (e.g., processor time, and/or processor cores) among the components hosted on that server. In such an implementation, data flows between components may be implemented using data communication services of the operating system and data network connecting the servers (e.g., named pipes, TCP/IP sessions, etc.). A subset of the components generally serve as sources and/or sinks of data from the overall computation, for example, to and/or from data files, database tables, and external data flows. After the component processes and data flows are established, for example, by a coordinating process, data then flows through the overall computation system implementing the computation expressed as a graph generally governed by availability of input data at each component and scheduling of computing resources for each of the components. Parallelism can therefore be achieved at least by enabling different components to be executed in parallel by different processes (hosted on the same or different server computers or processor cores), where different components executing in parallel on different paths through a dataflow graph is referred to herein as component parallelism, and different components executing in parallel on different portion of the same path through a dataflow graph is referred to herein as pipeline parallelism.

Other forms of parallelism are also supported by such an approach. For example, an input data set may be partitioned, for example, according to a partition of values of a field in records of the data set, with each part being sent to a separate copy of a component that processes records of the data set. Such separate copies (or "instances") of a component may be executed on separate server computers or separate processor cores of a server computer, thereby achieving what is referred to herein as data parallelism. The results of the separate components may be merged to again form a single data flow or data set. The number of computers or processor cores used to execute instances of the component would be designated by a developer at the time the dataflow graph is developed.

Various approaches may be used to improve efficiency of such an approach. For example, each instance of a component does not necessarily have to be hosted in its own operating system process, for example, using one operating system process to implement multiple components (e.g., components forming a connected subgraph of a larger graph).

At least some implementations of the approach described above suffer from limitations in relation to the efficiency of execution of the resulting processes on the underlying computer servers. For example, the limitations may be related to difficulty in reconfiguring a running instance of a graph to change a degree of data parallelism, to change to servers that host various components, and/or to balance load on different computation resources. Existing graph-based computation systems also suffer from slow startup times, often because too many processes are initiated unnecessarily, wasting large amounts of memory. Generally, processes start at the start-up of graph execution, and end when graph execution completes.

Other systems for distributing computation have been used in which an overall computation is divided into smaller parts, and the parts are distributed from one master computer server to various other (e.g., "slave") computer servers, which each independently perform a computation and which return their result to a master server. Some of such approaches are referred to as "grid computing." However, such approaches generally rely on the independence of each computation, without providing a mechanism for passing data between the computation parts, or scheduling and/or sequencing execution of the parts, except via the master computer server that invokes those parts. Therefore such approaches do not provide a direct and efficient solution to hosting computation involving interactions between multiple components.

Another approach for distributed computation on a large dataset makes use of a MapReduce framework, for example, as embodied in the Apache Hadoop® system. Generally, Hadoop has a distributed filesystem in which parts for each named file are distributed. A user specifies a computation in terms of two functions: a map function, which is executed on all the parts of the named inputs in a distributed manner, and a reduce function that is executed on parts of the output of the map function executions. The outputs of the map function executions are partitioned and stored in intermediate parts again in the distributed filesystem. The reduce function is then executed in a distributed manner to process the intermediate parts, yielding the result of the overall computation. Although computations that can be expressed in a MapReduce framework, and whose inputs and outputs are amendable for storage within the filesystem of the map-reduce framework can be executed efficiently, many computations do not match this framework and/or are not easily adapted to have all their inputs and outputs within the distributed filesystem.

In general, there is a need to increase computational efficiency (e.g., increase a number of records processed per unit of given computing resources) of a computation whose underlying specification is in terms of a graph, as compared to approaches described above, in which components (or parallel executing copies of components) are hosted on different servers. Furthermore, it is desirable to be able to adapt to varying computation resources and requirements.

There is also a need to provide a computation approach that permits adapting to variation in the computing resources that are available during execution of one or more graph based computations, and/or to variations in the computation load or time variation of load of different components of such computations, for example, due to characteristics of the data being processed. There is also a need to provide a computation approach that is able to efficiently make use of computational resources with different characteristics, for example, using servers that have different numbers of processors per server, different numbers of processor cores per processor, etc., and to support both homogeneous as well as heterogeneous environments efficiently. There is also a desire to make the start-up of graph-based computations quick. One aspect of providing such efficiency and adaptability is providing appropriate separation and abstraction barriers between choices made by a developer at the time of graph creation (at design-time), actions taken by a compiler (at compile-time), and actions taken by the runtime system (at runtime).

SUMMARY

In one aspect, in general, a method includes: storing a graph-based program specification including a plurality of components corresponding to tasks, at least some of the plurality of components each having at least one of: (1) at least one input port for receiving a collection of data elements to be processed by a corresponding task, or (2) at least one collection type output port for providing a collection of data elements to be processed by a task corresponding to a component linked to the collection type output port; and executing a program specified by the graph-based program specification, the executing including: receiving two or more data elements of a first collection of data elements into a first storage in a first order via a link connected to a collection type output port of a first component of the plurality of components and an input port of a second component of the plurality of components, and invoking a plurality of instances of a task corresponding to the second component to process data elements of the first collection of data elements, including retrieving the data elements from the first storage in a second order, without blocking invocation of any of the instances until after any particular instance completes processing one or more data elements, wherein the first order is different from the second order.

Aspects can include one or more of the following features.

Invoking one or more instances of the task corresponding to the second component includes invoking a plurality of instances of the task corresponding to the second component.

Invoking the plurality of instances of the task corresponding to the second component includes invoking a plurality of sequentially executing instances of the task corresponding to the second component.

Invoking a plurality of instances of the task corresponding to the second component includes invoking a plurality of concurrently executing instances of the task corresponding to the second component.

Each instance of the task of the plurality of instances of the task corresponding to the second component corresponds to a different, non-overlapping subset of the first collection of data elements.

Each different, non-overlapping subset of the first collection of data includes a single data element.

The input port of the second component is a collection type input port for receiving a collection of data elements to be processed by the task corresponding to the second component, and invoking one or more instances of the task corresponding to the second component includes invoking a single instance of the task corresponding to the second component.

The single instance of the task corresponding to the second component processes the data elements of the first collection of data elements iteratively.

The executing further includes generating an output including a first number of data elements that is the same as a second number of data elements in the first collection.

The executing further includes providing the output to a second storage in a third order that is independent of the first order of the first collection of data elements.

The executing further includes generating an output including a first number of data elements that is different from a second number of data elements in the first collection.

At least some of the plurality of components each have at least one scalar type input port for receiving a single data element to be processed by a corresponding task, and at least one scalar type output port for providing a single data element to be processed by a task corresponding to a component linked to the scalar type output port; and executing the program specified by the graph-based program specification further includes: receiving a single data element at a scalar type input port of a third component of the plurality of components from a scalar type output port of a fourth component of the plurality of components via a link connecting the scalar type output port to the scalar type input port; and invoking an instance of a task corresponding to the third component in response to receiving the single data element at the scalar type input port.

Executing the program specified by the graph-based program specification further includes preventing invocation of the task corresponding to the third component until after the single data element is received at the scalar type input port.

Executing the program specified by the graph-based program specification further includes preventing invocation of tasks corresponding to components depending, both directly and indirectly, from the third component until after the single data element is received at the scalar type input port.

The method further includes determining the presence of the link connected to the collection type output port of the first component and the input port of the second component, the presence of said link signaling that the data elements within the first collection can be reordered.

In another aspect, in general, software is stored in a non-transitory form on a computer-readable medium, the software including instructions for causing a computing system to: store a graph-based program specification including a plurality of components corresponding to tasks, at least some of the plurality of components each having at least one of: (1) at least one input port for receiving a collection of data elements to be processed by a corresponding task, or (2) at least one collection output port for providing a collection of data elements to be processed by a task corresponding to a component linked to the collection output port; and execute a program specified by the graph-based program specification, the executing including receiving two or more data elements of a first collection of data elements into a first storage in a first order via a link connected to a collection output port of a first component of the plurality of components and an input port of a second component of the plurality of components, and invoking a plurality of instances of a task corresponding to the second component to process data elements of the first collection of data elements, including retrieving the data elements from the first storage in a second order, without blocking invocation of any of the instances until after any particular instance completes processing one or more data elements, wherein the first order is different from the second order.

In another aspect, in general, a computing system includes: a data storage system for storing a graph-based program specification including a plurality of components corresponding to tasks, at least some of the plurality of components each having at least one of: (1) at least one input port for receiving a collection of data elements to be processed by a corresponding task, or (2) at least one collection output port for providing a collection of data elements to be processed by a task corresponding to a component linked to the collection output port; and at least one processor configured to execute a program specified by the graph-based program specification, the executing including receiving two or more data elements of a first collection of data elements into a first storage in a first order via a link connected to a collection output port of a first component of the plurality of components and an input port of a second component of the plurality of components, and invoking a plurality of instances of a task corresponding to the second component to process data elements of the first collection of data elements, including retrieving the data elements from the first storage in a second order, without blocking invocation of any of the instances until after any particular instance completes processing one or more data elements, wherein the first order is different from the second order.

In another aspect, in general, a computing system includes: means for storing a graph-based program specification including a plurality of components corresponding to tasks, at least some of the plurality of components each having at least one of: (1) at least one input port for receiving a collection of data elements to be processed by a corresponding task, or (2) at least one collection output port for providing a collection of data elements to be processed by a task corresponding to a component linked to the collection output port; and means for executing a program specified by the graph, the executing including receiving two or more data elements of a first collection of data elements into a first storage in a first order via a link connected to a collection output port of a first component of the plurality of components and an input port of a second component of the plurality of components, and invoking a plurality of instances of a task corresponding to the second component to process data elements of the first collection of data elements, including retrieving the data elements from the first storage in a second order, without blocking invocation of any of the instances until after any particular instance completes processing one or more data elements, wherein the first order is different from the second order.

Aspects can have one or more of the following advantages.

The techniques described herein also facilitate the efficient processing of high volumes of data in the computing system using unconventional technical features at various layers of its architecture. These technical features work together over various stages of operation of the computing system, including design-time, compile-time, and runtime. A programming platform enables a graph-based program specification to specify a desired computation at design-time. A compiler prepares a target program specification, at compile-time, for efficiently distributing fine-grained tasks among servers of the computing system at runtime. For example, the tasks are configured according to any control flow and data flow constraints within the graph-based program specification. The runtime system supports dynamic distribution of these tasks for concurrent execution in a manner that increases computational efficiency (e.g., in numbers of records processed per unit of given computing resources). The various technical features work together to achieve the efficiency gains over conventional systems.

For example, the computing system is able to process data elements using tasks corresponding to components of a data processing graph (or other graph-based program specification) in a manner that facilitates concurrent execution. The computing system is able to identify collection type output ports for providing a collection of data elements associated with a particular kind of storage. For example a buffer can be configured to receive data elements in a first order, and then after instances of tasks are invoked to process data elements, data elements can be retrieved in a second order, without blocking invocation of any of the instances until after any particular instance completes processing one or more data elements. The computing system is able to operate with this flexibility, which facilitates task parallelization, because the collection type output port signals to the runtime system a license to reorder the data elements within a collection. Thus, the computing system can ensure that computations on collections are parallelized in a manner that improves the efficiency of the internal functioning of the computing system and contributes to the efficient execution of data processing graphs.

These techniques also exhibit further technical effects on the internal functioning of the computing system when executing the methods described herein, such as reducing demand on memory and other computing resources, and reducing latency of the system in processing individual data elements. In particular, these advantages contribute to the efficient execution of data processing graphs. For example, conventional graph-based computation systems may have relatively higher latency (e.g., on the order tens of milliseconds) due to the number of processes (e.g., Unix processes) that are started by other processes when executing a graph, and the resulting cumulative start-up time of those processes. Whereas, techniques described herein facilitate relatively lower latency (e.g., on the order of tens of microseconds), and higher throughput of data processed per second, by allowing program code within a single process to start other program code directly without the process start-up overhead. Other aspects that contribute to efficient execution of data processing graphs will be evident in the following description.

Other features and advantages of the invention will become apparent from the following description, and from the claims.

DESCRIPTION OF DRAWINGS

FIG. 3A is a data processing graph including a number of scalar output port to scalar input port connections.

FIG. 3B is a data processing graph including a number of collection output port to collection input port connections.

FIG. 3C is a data processing graph including a collection output port to scalar input port connection and a scalar output port to collection input port connection.

FIGS. 12A-12B are diagrams of examples of data processing graphs and corresponding control graphs.

DESCRIPTION

Figure 1:
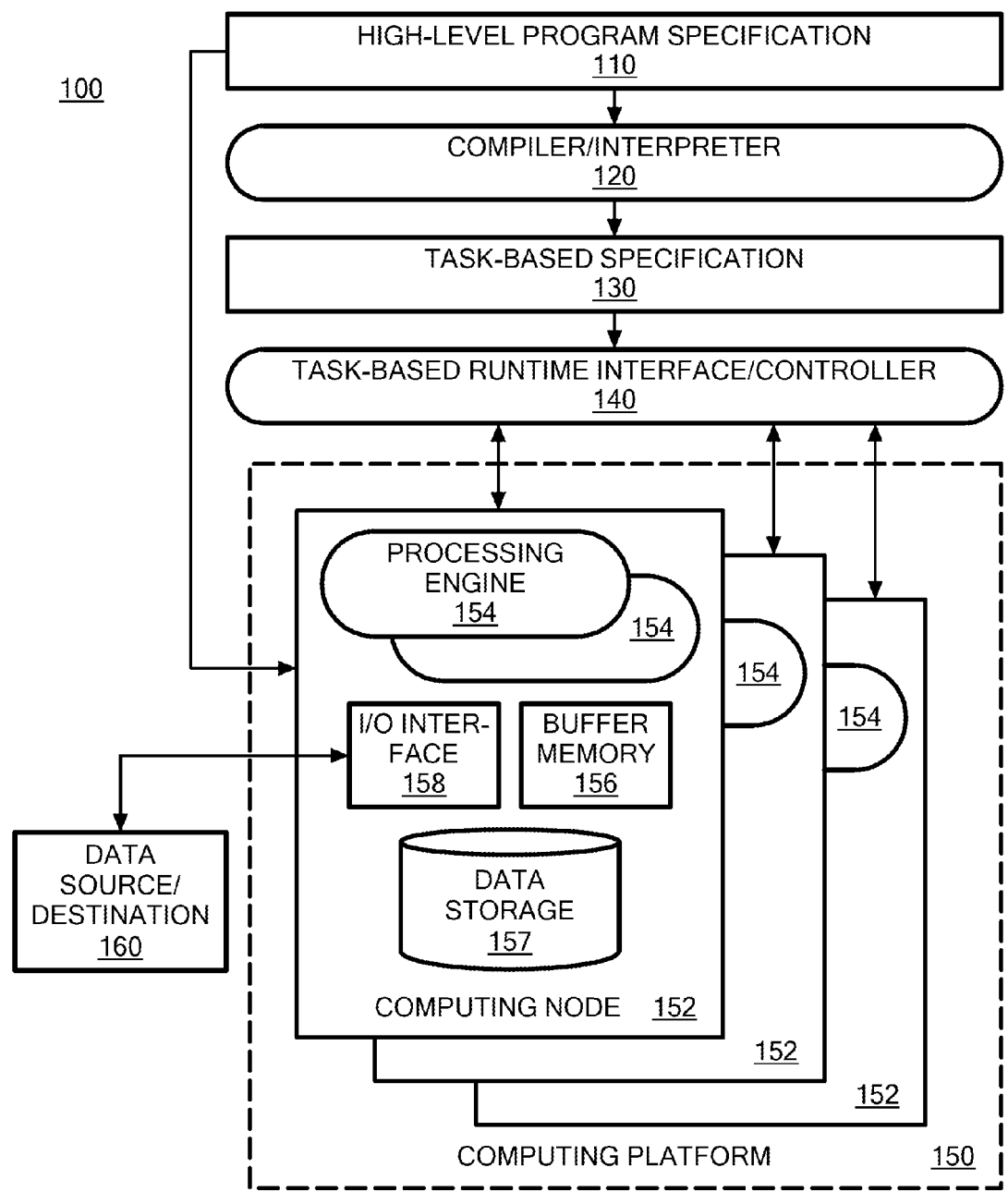
FIG. 1 is a block diagram of a task-based computation system.

Referring to FIG. 1, a task-based computation system 100 uses a high-level program specification 110 to control computation and storage resources of a computing platform 150 to execute the computation specified by the program specification 110. A compiler/interpreter 120 receives the high-level program specification 110 and generates a task-based specification 130 that is in a form that can be executed by a task-based runtime interface/controller 140. The compiler/interpreter 120 identifies one or more "execution sets" of one or more "components" that can be instantiated, individually or as a unit, as fine-grained tasks to be applied to each of multiple data elements. Part of the compilation or interpretation process involves identifying these execution sets and preparing the sets for execution, as described in more detail below. It should be understood that the compiler/interpreter 120 may use any of variety of algorithms that include steps such as parsing the high-level program specification 110, verifying syntax, type checking data formats, generating any errors or warnings, and preparing the task-based specification 130, and the compiler/interpreter 120 can make use of a variety of techniques, for example, to optimize the efficiency of the computation performed on the computing platform 150. A target program specification generated by the compiler/interpreter 120 can itself be in an intermediate form that is to be further processed (e.g., further compiled, interpreted, etc.) by another part of the system 100 to produce the task-based specification 130. The discussion below outlines one or more examples of such transformations but of course other approaches to the transformations are possible as would be understood, for example, by one skilled in compiler design.

Generally, the computation platform 150 is made up of a number of computing nodes 152 (e.g., individual server computers that provide both distributed computation resources and distributed storage resources) thereby enabling high degrees of parallelism. As discussed in further detail below, the computation represented in the high-level program specification 110 is executed on the computing platform 150 as relatively fine-grain tasks, further enabling efficient parallel execution of the specified computation.

1 Data Processing Graphs

In some embodiments, the high-level program specification 110 is a type of graph-based program specification called a "data processing graph" that includes a set of "components", each specifying a portion of an overall data processing computation to be performed on data. The components are represented, for example, in a programming user interface and/or in a data representation of the computation, as nodes in a graph. Unlike some graph-based program specifications, such as the dataflow graphs described in the Background above, the data processing graphs may include links between the nodes that represent any of transfer of data, or transfer of control, or both. One way to indicate the characteristics of the links is by providing different types of ports on the components. The links are directed links that are coupled from an output port of an upstream component to an input port of a downstream component. The ports have indicators that represent characteristics of how data elements are written and read from the links and/or how the components are controlled to process data.

These ports may have a number of different characteristics. One characteristic of a port is its directionality as an input port or output port. The directed links represent data and/or control being conveyed from an output port of an upstream component to an input port of a downstream component. A developer is permitted to link together ports of different types. Some of the data processing characteristics of the data processing graph depend on how ports of different types are linked together. For example, links between different types of ports can lead to nested subsets of components in different "execution sets" that provide a hierarchical form of parallelism, as described in more detail below. Certain data processing characteristics are implied by the type of the port. The different types of ports that a component may have include:

Collection input or output ports, meaning that an instance of the component will read or write, respectively, all data elements of a collection that will pass over the link coupled to the port. For a pair of components with a single link between their collection ports, the downstream component is generally permitted to read data elements as they are being written by an upstream component, enabling pipeline parallelism between upstream and downstream components. The data elements can also be reordered, which enables efficiency in parallelization, as described in more detail below. In some graphical representations, for example in programming graphical interfaces, such collection ports are generally indicated by a square connector symbol at the component.

Scalar input or output ports, meaning that an instance of the component will read or write, respectively, at most one data element from or to a link coupled to the port. For a pair of components with a single link between their scalar ports, serial execution of the down stream component after the upstream component has finished executing is enforced using transfer of the single data element as a transfer of control. In some graphical representations, for example in programming graphical interfaces, such scalar ports are generally indicated by a triangle connector symbol at the component.

Control input or output ports, which are similar to scalar inputs or outputs, but no data element is required to be sent, and are used to communicate transfers of control between components. For a pair of components with a link between their control ports, serial execution of the down stream component after the upstream component has finished executing is enforced (even if those components also have a link between collection ports). In some graphical representations, for example in programming graphical interfaces, such control ports are generally indicated by a circular connector symbol at the component.

These different types of ports enable flexible design of data processing graphs, allowing powerful combinations of data and control flow with the overlapping properties of the port types. In particular, there are two types of ports, collection ports and scalar ports, that convey data in some form (called "data ports"); and there are two types of ports, scalar ports and control ports, that enforce serial execution (called "serial ports"). A data processing graph will generally have one or more components that are "source components" without any connected input data ports and one or more components that are "sink components" without any connected output data ports. Some components will have both connected input and output data ports. In some embodiments, the graphs are not permitted to have cycles, and therefore must be a directed acyclic graph (DAG). This feature can be used to take advantage of certain characteristics of DAGs, as described in more detail below.

The use of dedicated control ports on components of a data processing graph also enable flexible control of different parts of a computation that is not possible using certain other control flow techniques. For example, job control solutions that are able to apply dependency constraints between dataflow graphs don't provide the fine-grained control enabled by control ports that define dependency constraints between components within a single dataflow graph. Also, dataflow graphs that assign components to different phases that run sequentially don't allow the flexibility of sequencing individual components. For example, nested control topologies that are not possible using simple phases can be defined using the control ports and execution sets described herein. This greater flexibility can also potentially improve performance by allowing more components to run concurrently when possible.

By connecting different types of ports in different ways, a developer is able to specify different types of link configurations between ports of components of a data processing graph. One type of link configuration may correspond to a particular type of port being connected to the same type of port (e.g., a scalar-to-scalar link), and another type of link configuration may correspond to a particular type of port being connected to a different type of port (e.g., a collection-to-scalar link), for example. These different types of link configurations serve both as a way for the developer to visually identify the intended behavior associated with a part of the data processing graph, and as a way to indicate to the compiler/interpreter 120 a corresponding type of compilation process needed to enable that behavior. While the examples described herein use unique shapes for different types of ports to visually represent different types of link configurations, other implementations of the system could distinguish the behaviors of different types of link configurations by providing different types of links and assigning each type of link a unique visual indicator (e.g., thickness, line type, color, etc.). However, to represent the same variety of link configurations possible with the three types of ports listed above using link type instead of port type, there would be more than three types of links (e.g., scalar-to-scalar, collection-to-collection, control-to-control, collection-to-scalar, scalar-to-collection, scalar-to-control, etc.) Other examples could include different types of ports, but without explicitly indicating the port type visually within a data processing graph.

The compiler/interpreter 120 performs procedures to prepare a data processing graph for execution. A first procedure is an execution set discovery pre-processing procedure to identify a hierarchy of potentially nested execution sets of components. A second procedure is a control graph generation procedure to generate, for each execution set, a corresponding control graph that the compiler/interpreter 120 will use to form control code that will effectively implement a state machine at runtime for controlling execution of the components within each execution set. Each of these procedures will be described in greater detail below.

A component with at least one input data port specifies the processing to be performed on each input data element or collection (or tuple of data elements and/or collections on multiple of its input ports). One form of such a specification is as a procedure to be performed on one or a tuple of input data elements and/or collections. If the component has at least one output data port, it can produce corresponding one or a tuple of output data elements and/or collections. Such a procedure may be specified in a high level statement-based language (e.g., using Java source statements, or a Data Manipulation Language (DML) for instance as used in U.S. Pat. No. 8,069,129 "Editing and Compiling Business Rules"), or may be provided in some fully or partially compiled form (e.g., as Java bytecode). For example, a component may have a work procedure whose arguments include its input data elements and/or collections and its output data elements and/or collections, or more generally, references to such data elements or collections or to procedures or data objects (referred to herein as "handles") that are used to acquire input and provide output data elements or collections.

Work procedures may be of various types. Without intending to limit the types of procedures that may be specified, one type of work procedure specifies a discrete computation on data elements according to a record format. A single data element may be a record from a table (or other type of dataset), and a collection of records may be all of the records in a table. For example, one type of work procedure for a component with a single scalar input port and a single scalar output port includes receiving one input record, performing a computation on that record, and providing one output record. Another type of work procedure may specify how a tuple of input records received from multiple scalar input ports are processed to form a tuple of output records sent out on multiple scalar output ports.

The semantic definition of the computation specified by the data processing graph is inherently parallel in that it represents constraints and/or lack of constraints on ordering and concurrency of processing of the computation defined by the graph. Therefore, the definition of the computation does not require that the result is equivalent to some sequential ordering of the steps of the computation. On the other hand, the definition of the computation does provide certain constraints that require sequencing of parts of the computation, and restrictions of parallel execution of parts of the computation.

In the discussion of data processing graphs, implementation of instances of components as separate "tasks" in a runtime system is assumed as a means of representing sequencing and parallelization constraints. A more specific discussion of an implementation of the data processing graph into a task-based specification, which implements the computation consistently with the semantic definition, is discussed more fully after the discussion of the characteristics of the graph-based specification itself.

Generally, each component in a data processing graph will be instantiated in the computing platform a number of times during execution of the graph. The number of instances of each component may depend on which of multiple execution sets the component is assigned to. When multiple instances of a component are instantiated, more than one instance may execute in parallel, and different instances may execute in different computing nodes in the system. The interconnections of the components, including the types of ports, determine the nature of parallel processing that is permitted by a specified data processing graph.

Although in general state is not maintained between executions of different instances of a component, as discussed below, certain provisions are provided in the system for explicitly referencing persistent storage that may span executions of multiple instances of a component.

In examples where a work procedure specifies how a single record is processed to produce a single output record, and the ports are indicated to be collection ports, a single instance of the component may be executed, and the work procedure is iterated to process successive records to generate successive output records. In this situation, it is possible that state is maintained within the component from iteration to iteration.

In examples where a work procedure specifies how a single record is processed to produce a single output record, and the ports are indicated to be scalar ports, multiple instances of the component may be executed, and no state is maintained between executions of the work procedure for different input records.

Also, in some embodiments, the system supports work procedures that do not follow a finest-grained specification introduced above. For example, a work procedure may internally implement an iteration, for example, which accepts a single record through a scalar port and provides multiple output records through a collection port.

As noted above, there are two types of data ports, collection ports and scalar ports, that convey data in some form; and there are two types of serial ports, scalar ports and control ports, that enforce serial execution. In some cases, a port of one type can be connected by a link to a port of another type. Some of those cases will be described below. In some cases, a port of one type will be linked to a port of the same type. A link between two control ports (called a "control link") imposes serial execution ordering between linked components, without requiring data to be sent over the link. A link between two data ports (called a "data link") provides data flow, and also enforces a serial execution ordering constraint in the case of scalar ports, and does not require serial execution ordering in case of collection ports. A typical component generally has at least two kinds of ports including input and output data ports (either collection ports or scalar ports) and input and output control ports. Control links connect the control port of an upstream component to a control port of a downstream component. Similarly, data links connect the data port of an upstream component to a data port of a downstream component.

A graphical user interface can be used by developers to specify a specific data processing computation from a set of components, each of which carries out a particular task (e.g., a data processing task). The developer does so by assembling a data processing graph on a canvas area shown on a display screen. This involves placing the components on the canvas, connecting their various ports with appropriate links, and otherwise configuring the components appropriately. The following simple example illustrates certain behavior in the context of components that have a single pair of collection ports and a single pair of control ports.

Figure 2A:
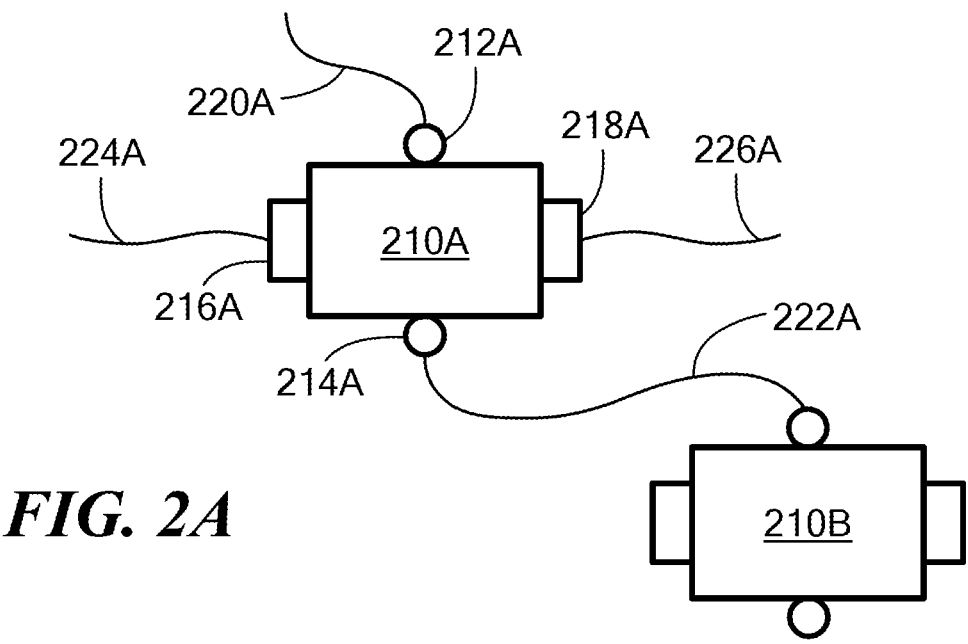
FIG. 2A is an example of a portion of a data processing graph with control and data ports.

FIG. 2a shows an example in which a portion of a data processing graph being assembled includes a first component 210A with input and output control ports 212A, 214A, and input and output collection ports 216A, 218A. Control links 220A, 222A connect the input and output control ports 212A, 214A to control ports of other components in the data processing graph. Similarly, data links 224A, 226A connect the input and output collection ports 216A, 218A to ports of other components in the data processing graph. The collection ports 216A, 218A are represented in the figure with rectangular shape, whereas the control ports 212A, 214A are represented with circular shape.

In general, the input collection port 216A receives data to be processed by the component 210A, and the output collection port 214 provides data that has been processed by the component 210A. In the case of a collection port, this data is generally an unordered collection of an unspecified number of data elements. In a particular instance of the overall computation, the collection may include multiple data elements, or a single data element, or no data elements. In some implementations, a collection is associated with a parameter that determines whether the elements in the collection are unordered or ordered (and if ordered, what determines the ordering). As will be described in greater detail below, for an unordered collection, the order in which the data elements are processed by the component at the receiving side of the data link may be different from the order in which the component at the sending side of the data link provides those data elements. Thus, in the case of collection ports, the data link between them acts as a "bag" of data elements from which a data element may be drawn in an arbitrary order, as opposed to a "conveyor belt" that moves data elements from one component to another in a specific order.

The control links are used to convey control information between control ports, which determines whether and when a component will begin execution. For example, the control link 222A either indicates that the component 210B is to begin execution after the component 210A has completed (i.e., in a serial order), or indicates that the component 210B is not to begin execution (i.e., is to be "suppressed"). Thus, while no data is sent over a control link, it can be viewed as sending a signal to the component on the receiving side. The way this signal is sent may vary depending on the implementation, and in some implementations may involve the sending of a control message between components. Other implementations may not involve sending an actual control message, but may instead involve a process directly invoking a process or calling a function associated with the task represented by the component on the receiving side (or omission of such invocation or function call in the case of suppression).

The ability to link control ports thus enables the developer to control the relative ordering among the different portions of a data processing computation represented by different components of the data processing graph. Additionally, providing this ordering mechanism using control ports on the components enables the mixing of logic associated with data flow and control flow. In effect, this enables data to be used to make decisions about control.

In the example shown in FIG. 2A, control ports connect to other control ports, and data ports connect to other data ports. However, the data on a data port inherently carries two different kinds of information. The first kind is the data itself, and the second is the existence of data at all. This second kind of information can be used as a control signal. As a result, it becomes possible to provide additional flexibility by enabling a scalar data port to be connected to a control port.

Figure 2B:
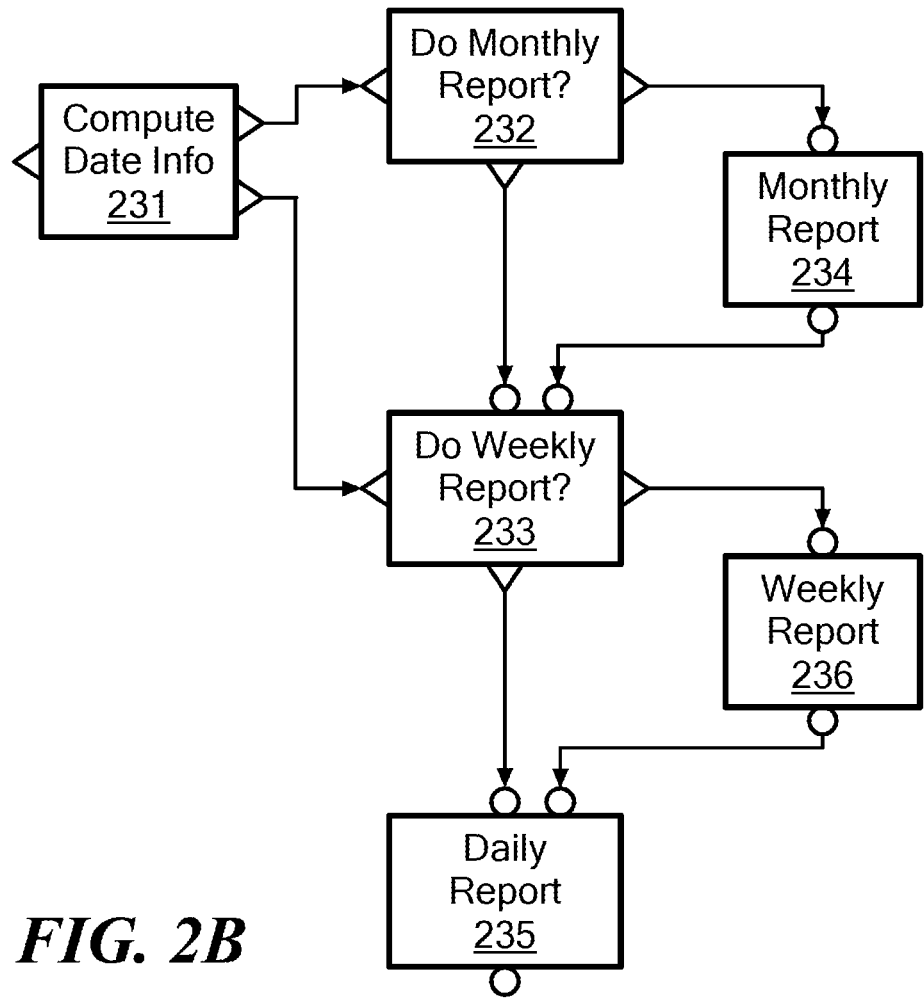
FIGS. 2B-2C are examples of data processing graphs with control and data ports.

FIG. 2B shows an example data processing graph 230 that exploits the flexibility imparted by an ability to connect scalar ports to control ports.

The data processing graph 230 features a first component 231 labeled "Compute Date Info," a second component 232 labeled "Do Monthly Report?", a third component 233 labeled "Do Weekly Report," a fourth component 234 labeled "Monthly Report," a fifth component 235 labeled "Do Weekly Report?", and a sixth component 236 labeled "Weekly Report." The data processing graph 230 carries out a procedure that always produces either a daily report, a daily report and a weekly report, or all three kinds of report. The decision on which of these outcomes will occur depends on the evaluation of certain date information provided by the first component 231. Thus, FIG. 2B shows an example of data effectively in control of execution.

Execution begins when the first component 231 provides date information out its output scalar ports to the input scalar port of the second component 232 and to the input scalar port of the third component 233. The second component 232, which has no connected input control port, immediately goes to work. All other components, including the third component 233, have connected input control port(s) and must wait to be activated by a suitable positive control signal.

The second component 232 inspects this date information and determines whether it is appropriate to do a monthly report. There are two possible outcomes: either a monthly report is required, or it is not. Both the second component 232 and the third component 233 have two output scalar ports, and are configured to perform a selection function that provides a data element that acts as a positive control signal on one output scalar port (i.e., the selected port), and negative control signal on the other output scalar port.

If, based on the date information, the second component 232 determines that no monthly report is required, the second component 232 sends a data element out its bottom output scalar port to the input control port of the third component 233. This data element is interpreted as a positive control signal that indicates to the third component 233 that the second component 232 has finished processing the data provided by the first component 231 and that the third component 233 may now begin processing its received date information data.

On the other hand, if the second component 232 determines that, based on the date information provided by the first component 231, a monthly report is required, it instead sends a data element that is interpreted as a positive control signal from its output scalar port to an input control port of the fourth component 234. Although the data element is more than just a control signal, the fourth component 234 treats it as a positive control signal because it is being provided to its input control port. The fourth component 234 ignores the actual data in the data element and just uses the existence of the data element as a positive control signal.

The fourth component 234 proceeds to create a monthly report. Upon completion, the fourth component 234 outputs a control signal from its output control port to an input control port of the third component 233. This tells the third component 233 that it (i.e. the third component 233) can now begin processing the date information that the first component 231 supplied to it.

Thus, the third component 233 will always eventually process the data provided by the first component 231 via its input scalar port. The only difference lies in which component triggers it to start processing: the second component 232 or the fourth component 234. This is because the two input control ports on the third component 233 will be combined using OR logic such that a positive control signal received at either port (or both) will trigger processing.

The remainder of the graph 230 operates in essentially the same way but with the third component 233 taking over the role of the second component 232 and the sixth component 236 taking over the role of the fourth component 234.

Upon being activated by a control signal at its input control ports, which comes either from the second component 232 or the fourth component 234, the third component 233 inspects the date information provided by the first component 231 over the data link connecting the first component 231 to the third component 233. If the third component 233 determines from the date information that no weekly report is required, it sends a data element interpreted as a positive control signal out of one of its output scalar ports to the input control port of the fifth component 235.

On the other hand, if the third component 233 determines that a weekly report is required, it sends a data element interpreted as a positive control signal out of its other output scalar port to an input control port of the sixth component 236. The sixth component 236 proceeds to create a weekly report. Upon completion, it sends a data element interpreted as a positive control signal from its output scalar port to an input control port of the fifth component 235.

The fifth component 235 will thus always eventually execute, with the only difference being whether the third component 233 or the sixth component 236 ultimately triggers it to begin execution. Upon receiving a control signal from either the third component 233 or the sixth component 236, the fifth component 235 creates the daily report.

Figure 2C:
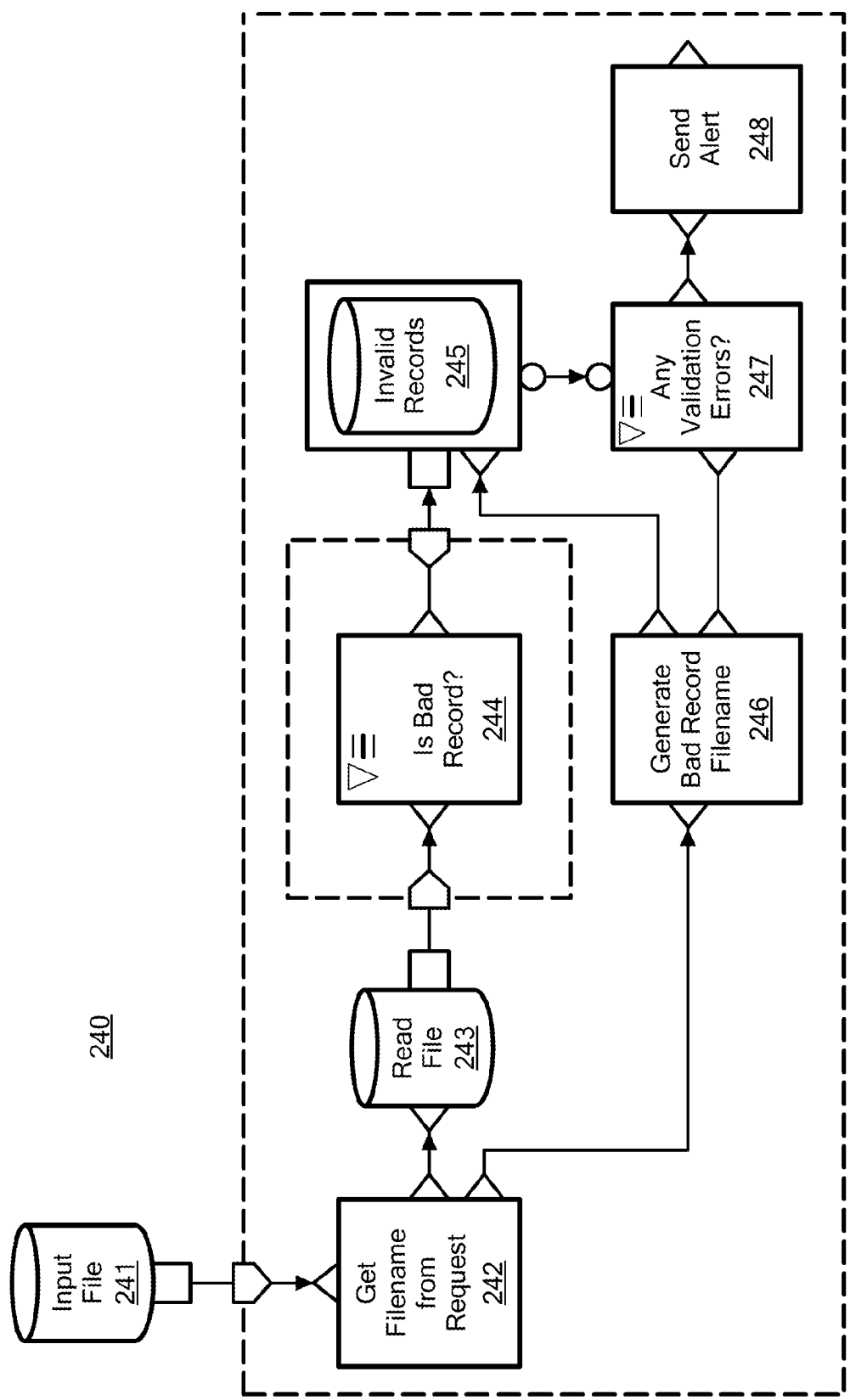

An example is shown in FIG. 2C, which also shows the use of both scalar and collection data ports.

FIG. 2C shows a data processing graph 240 having a first component 241 labeled "Input File," a second component 242 labeled "Get Filename From Request," a third component 243 labeled "Read File," a fourth component 244 labeled "Is Bad Record?", a fifth component 245 labeled "Invalid Records," a sixth component 246 labeled "Generate Bad Record Filename," a seventh component 247 labeled "Any Validation Errors?", and an eighth component 248 labeled "Send Alert." This graph is intended to write bad records to a file and to send an alert upon detecting such a bad record.

The components 241 and 243 are examples of components that serve as sources of data, and component 245 is an example of a component that serves as a sink of data. The components 241 and 243 use as their source an input file that may be stored in any of a variety of formats in a filesystem (such as a local filesystem, or a distributed filesystem). An input file component reads the contents of a file and produces a collection of records from that file. A scalar input port (as shown on component 243) provides a data element that specifies the location of the file to be read (e.g., a path or a uniform resource locator) and the record format to be used. In some cases the location and record format may be provided as parameters to the input file component, in which case the input scalar port need not be connected to any upstream component and need not be shown (as for component 241). A collection output port (as shown on both component 241 and 243) provides the collection of records. Similarly, an output file component (such as component 245) would write a collection of records received over an input collection port to an output file (whose location and record format may optionally be specified by an input scalar port). An input file or output file component may also include a control input or output port that is linked to a control port of another component (such as component 245).

In the illustrated data processing graph 240, components that are within the larger dashed rectangle are part of an execution set. This execution set contains another execution set nested within it. This nested execution set, also shown within a dashed rectangle, contains only the fourth component 244. Execution sets are discussed in more detail below.

In operation, the first component 241 reads an input file. As it is executing, it provides the collection of records within the input file to the second component via a data link from an output collection data port to an input collection data port of the second component 242. Different instances of the second component 242 and the other down stream components (which are in the same execution set) may be executed for each record in the collection, as will be described in more detail below. Since the second component 242 does not have anything connected to its control input, it immediately begins processing. Upon completion, the second component 242 provides a filename on its output scalar ports. This filename is received by both the third component 243 and the sixth component 246 at respective input scalar ports.

The third component 243 immediately reads the file identified by the filename and provides the content of the file on an output collection port for delivery to an input scalar port of an instance of the fourth component 244. Meanwhile, the sixth component 246 receives the same filename and outputs another filename, which it provides to both on output scalar ports connected to corresponding input scalar ports of the fifth component 245 and the seventh component 247.

Upon receiving a filename from the sixth component 246 and the bad records from the fourth component 244, the fifth component 245 writes the bad records to the output file whose filename is identified by the sixth component 246.

The seventh component 247 is the only one not primed to execute upon receiving data at its data input port. When the fifth component 245 is finished writing to the output file, it sends a control signal out its control output port to the input control port of the seventh component 247. If the seventh component 247 determines that there was an error, it then provides data to the input scalar port of the eighth component 248. This causes the eighth component 248 to generate an alarm. This provides an example in which control ports are used to limit execution of certain components within a data processing graph.

It should be apparent that the ability to control processing in one component based on the state of another component carries with it the possibility of controlling processing when a set of multiple upstream components have all reached particular states. For example, a data processing graph can support multiple control links to or from the same control port. Alternatively, in some implementations, a component can include multiple input and output control ports. Default logic can be applied by the compiler/interpreter 120. The developer can also provide custom logic for determining how control signals will be combined. This can be done by suitably arranging combinatorial logic to apply to the various control links of the upstream components, and trigger startup of a component only when a certain logical state is reached (e.g., when all upstream components have completed, and when at least one has sent an activation control signal in the case of the default OR logic).

In general, a control signal can be a signal that triggers the commencement of processing or triggers the suppression of processing. The former is a "positive control signal" and the latter is a "negative control signal." However, if combinatorial logic is used to determine whether or not a task should be invoked (triggering commencement of processing) it is possible for the logic to "invert" the usual interpretation, such that the task is invoked only when all inputs provide a negative control signal. Generally, the combinatorial logic may provide an arbitrary "truth table" for determining a next state in a state machine corresponding to the control graph described in more detail below.

An unconnected control port can be assigned a default state. In one embodiment, the default state corresponds to a positive control signal. As described in more detail below, this can be achieved by the use of implicit begin and end components in a control graph representing the data processing graph.

The different types of data ports on various components allow data to pass over links between components in different ways depending on the types of input and output ports that link those components. As described above, a scalar port represents production (for a scalar output port) or consumption (for a scalar input port) of at most a single data element (i.e., 0 or 1 data elements). Whereas, a collection port represents production (for a collection output port) or consumption (for a collection input port) of a set of potentially multiple data elements. By supporting both types of data ports in a single data processing graph, computing resources can be allocated more efficiently and a more complex control flow and data flow can be generated between tasks, allowing a developer to easily indicate the behavior that is desired.

Referring to FIG. 3A, a data processing graph 300 includes a series of three connected components, a first component (A1) 302, a second component (B1) 304, and a third component (C1) 306. The first component includes a collection type input port 308 and a scalar type output port 310. The second component 304 includes a scalar type input port 312 and a scalar type output port 314. The third component includes a scalar type input port 316 and a collection type output port 318.

A first link 320 connecting the scalar output port 310 of the first component 302 to the scalar input port 312 of the second component 304 both allows data to pass between the first component 302 and the second component 304 and at the same time enforces serial execution of the first and second components 302, 304. Similarly, a second link 322 connecting the scalar output port 314 of the second component 304 to the scalar input port 316 of the third component 306 both allows data to pass between the second component 304 and the third component 306 and enforces serial execution of the second and third components 304, 306.

Due to the interconnections of the scalar ports in FIG. 3A, the second component 304 begins executing only after the first component 302 completes (and passes a single data element over the first link 320), and the third component 306 begins executing only after the second component 304 completes (and passes a single data element over the second link 322). That is, each of the three components in the data processing graph runs once in the strict sequence A1/B1/C1.

In some examples, one or more of the components can be placed into a suppressed state, meaning that the one or more components do not execute and therefore do not pass any data elements out of their output ports. Enabling components to be suppressed avoids wasted resources, for example, by ensuring that components that will not perform any useful processing do not need computing resources (e.g., processes or memory) to be devoted to them. Any components with scalar input ports connected only to the output ports of suppressed components do not execute since they receive no data. For example, if the first component 302 is placed in a suppressed state then the scalar input port 312 of the second component 304 receives no data from the scalar output port 310 of the first component 302 and therefore does not execute. Since the second component 304 does not execute, the scalar input port 316 of the third component 306 receives no data from the scalar output port 314 of the second component 304 and also does not execute. Thus, the data passed between two scalar ports also acts as a positive control signal similar to the signal sent between two linked control ports.

In the exemplary data processing graph of FIG. 3A, the input port 308 of the first component 302 and the output port of the third component 318 happen to be collection ports, which have no effect on the serial execution behavior of the first, second, and third components 302, 304, 306 imposed by the scalar ports connecting them.

In general, collection ports are used both to pass a collection of data elements between components and at the same time may give the runtime system a license to reorder the data elements within that set. Reordering of data elements of an unordered collection is allowed because there is either no dependence on the state of the computation from one data element to another data element, or if there is global state that is accessed as each data element is processed the final state is independent of order in which those data elements were processed. This license to reorder provides flexibility for delaying decisions about parallelization until runtime.

Referring to FIG. 3B, a data processing graph 324 includes a series of three connected components, a first component (A2) 326, a second component (B2) 328, and a third component (C2) 330. The first component 326 includes a collection type input port 332 and a collection type output port 334. The second component 328 includes a collection type input port 336 and a collection type output port 338. The third component 330 includes a collection type input port 340 and a collection type output port 342.

Each of the three components 326, 328, 330 specifies how a collection of one or more input elements is processed to generate a collection of one or more output elements. There is not necessarily a one-to-one correspondence between a particular input element and a particular output element. For example, a number of data elements in a first collection of data elements 344 between the first component 326 and the second component 328 may be different than a number of elements in a second collection of data elements 346 between the second component 328 and the third component 330. The only constraints placed on connections between collection ports is that each data element in the collection is passed from one collection port to another, while allowing arbitrary reordering between the first component 326 and the second component 328 and between the second component 328 and the third component 330 with respect to the order in which they are processed. Alternatively, in other examples, the collection ports can optionally be configured to preserve order. In this example, the three components 326, 328, 330 start up together and run concurrently, allowing pipeline parallelism.

The compiler/interpreter 120 described in relation to FIG. 1 is configured to recognize collection port to collection port connections and translate the computation into executable code in a manner that is appropriate for the computation being performed. The unordered nature of the collection data link gives the compiler/interpreter 120 flexibility in how this is accomplished. For example, if it happens to be the case that, for the second component 328, each output element is computed based on a single input element (i.e., there is no state maintained across data elements), the compiler/interpreter 120 may allow the runtime system to dynamically parallelize the processing of the data elements by instantiating as many as one instance of the component per data element (e.g., depending on the computing resources available at runtime). Optionally, state can be maintained across data elements in components that have input collection ports in special cases. But in the general case, the runtime system can be allowed to parallelize the component's task. For example, if the runtime system detects that no global state is being maintained, it may be allowed to parallelize the task. Some components can also be configured to support maintaining state, in which case parallelization may be disallowed. If the collection is unordered, the fact that order does not need to be preserved among data elements means that each instance of the second component 328 can provide its output data element to the third component 330 as soon as it is available, and the third component 330 can begin processing those data elements before all instances of the second component 328 have finished.

In some examples, a graph developer can explicitly indicate that the processing of the data elements in a collection of data may be dynamically parallelized by connecting a collection type output port of one component to a scalar type input port of another component. Such an indication also requires that state is not maintained between processing of different elements of the collection. Referring to FIG. 3C, a data processing graph 348 includes a series of three connected components, a first component (A3) 350, a second component (B3) 352, and a third component (C3) 354. The first component 350 includes a collection type input port 356 and a collection type output port 358. The second component 352 includes a scalar type input port 360 and a scalar type output port 362. The third component 354 includes a collection type input port 364 and a collection type output port 366.

The collection type output port 358 of the first component is connected to the scalar type input port 360 of the second component 352 by a first link 368 and the scalar type output port 362 of the second component 352 is connected to the collection type input port 364 by a second link 370. As is described in greater detail below, a link from a collection type output port to a scalar type input port implies an entry point into an execution set and a link from a scalar type output port to a collection type input port implies an exit point of an execution set. Very generally, as is described in greater detail below, components included in an execution set may be dynamically parallelized by the runtime controller to process data elements from a collection of data elements.

In FIG. 3C, the link 368 between the collection type output port 358 of the first component 350 and the scalar type input port 360 of the second component 352 implies an entry point into an execution set. The link 370 between the scalar type output port 362 of the second component 352 and the collection type input port 364 of the third component 354 implies an exit point of the execution set. That is, the second component 352 is the only component in the execution set.

Since the second component 352 is included in the execution set, a separate instance of the second component 352 is launched for each data element received from the collection type output port 358 of the first component 350. At least some of the separate instances may run in parallel, depending on decisions that may not be made until runtime. In this example the first (350) and third (354) components start up together and run concurrently, while the second component (352) runs once for each data element within the collection received over the link 368. Alternatively, the second component 352 can run once for each tuple of multiple data elements within the collection.

2 Execution Sets

As is described above in relation to FIG. 1, the compiler/interpreter 120 performs an execution set discovery preprocessing procedure on a data processing graph to prepare the data processing graph for execution. In a general sense, as used herein, the term "execution set" refers to a set of one or more components that can be invoked as a unit and applied to a portion of data, such as a portion of the data elements of an output collection port. Therefore, at most one instance of each component in the execution set is executed for each input data element (or tuple of multiple input data elements presented to one or more input ports of the execution set). Within the execution set, sequencing constraints are imposed by the links to scalar and control ports, with parallel execution of the components in an execution set being permissible as long as the sequencing constraints are not violated. The code prepared for an execution set by the compiler/interpreter 120 may include embedded information (e.g., an annotation or modifier) that indicates how the tasks corresponding to the components are to be performed when the code is executed (e.g., degree of parallelism). In examples in which one instance of an execution set is executed for a tuple of multiple data elements in a received collection, the tuple may consist of a fixed number of data elements, for example, or a number of data elements that share some characteristic (e.g., a common key value). In examples in which there are at least some components that are permitted to execute in parallel, the execution set may be implemented using multiple tasks, for example, a task for the execution set as a whole, and one or more sub-tasks for concurrent execution of an instance of one or more of the components. Therefore, tasks representing different instances of the execution set may themselves be broken down into even finer-grained tasks, for example, with subtasks that may execute concurrently. Tasks for different execution sets may generally be executed independently and in parallel. So if a large dataset has a million records, for example, there may be a million independent tasks. Some of the tasks may be executed on different nodes 152 of the computing platform 150. Tasks may be executed using lightweight threads that may be efficiently executed concurrently, even on a single node 152.

In general, the execution sets identified by the assignment algorithm(s) (i.e., the execution sets other than a root execution set) receive data elements through a "driving" scalar data port at the boundary of the execution set. For each data element received at the driving input scalar data port of the execution set, each of the components within the execution set are executed once (if activated) or not at all (if suppressed). Multiple instances of the execution set can be instantiated and executed in parallel to process multiple data elements that are available to the execution set from an upstream collection port. A degree of parallelism for an execution set can be determined at runtime (and includes a possible decision not to parallelize the execution set), and is limited only by the computational resources available at runtime. The individual outputs of the independent instances of the execution set are gathered at output port(s) of the execution set, regardless of order, and are made available to downstream components. Alternatively, in other embodiments, execution sets other than the root execution set can be recognized (in some cases, based on user input) that do not require a driving input scalar data port. Such an execution set without a driving input scalar data port can be executed, using the procedures described herein, in a single instance if appropriate (e.g., for a latched execution set described below), or in multiple instances in parallel. For example, a parameter can be set that determines a number of times an execution set will execute, and/or a number of parallel instances of the execution set that will execute.

Very generally, the execution set discovery procedure uses an assignment algorithm that determines subsets of components within the data processing graph that are to be applied as a set to input elements of an unordered collection of data elements. The assignment algorithm traverses the data processing graph and assigns each component to a subset based on assignment rules. As is made apparent in the following examples, a given data processing graph may include a number of execution sets nested at different levels of an execution set hierarchy.

Figure 4A:
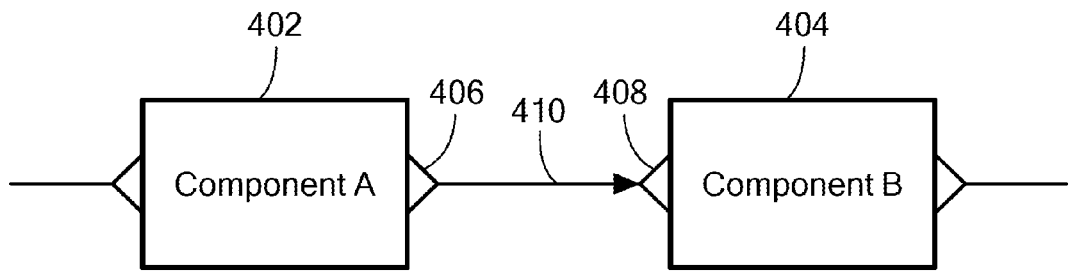
FIG. 4A is scalar port to scalar port connection between two components.

In the data processing graphs described herein, there are two types of data ports: scalar data ports and collection data ports. In general, a pair of linked components (i.e., upstream component A 402 and downstream component B 404 of FIGS. 4A to 4D) will be in the same execution set by default if they are connected by a link between ports of the same type (unless they are in different execution sets for another reason). In FIG. 4A, component A 402 has an output port 406 with a scalar type and component B 404 has an input port 408 with a scalar type. Since the link 410 between component A 402 and component B 404 connects two scalar type ports, components A and B 402, 404 are in the same execution set in this example. In FIG. 4A, since the link between component A 402 and component B 404 is a scalar-to-scalar link, either 0 data elements or 1 data element is passed between upstream component A 402 and downstream component B 404 over the link 410. Upon completion of upstream component A's 402 processing, a data element is passed over the link 410, unless upstream component A 402 is suppressed (as is described above), in which case no data element is passed over the link 410.

Figure 4B:
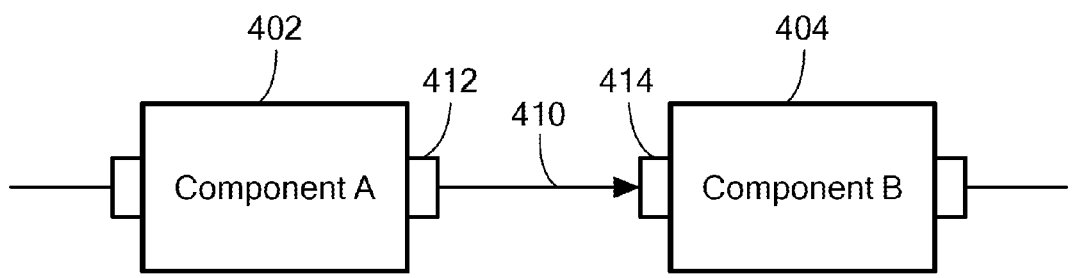
FIG. 4B is a collection port to collection port connection between two components.

Referring to FIG. 4B, component A 402 has an output port 412 with a collection type and component B 404 has an input port 414 with a collection type. Since the link 410 between component A 402 and component B 404 connects two collection type ports, component A 402 and component B 404 are also in the same execution set in this example. In FIG. 4B, since the link 410 between component A 402 and component B 404 is a collection-to-collection link, a set of data elements is passed between the upstream and downstream components over the link 410.

Figure 4C:
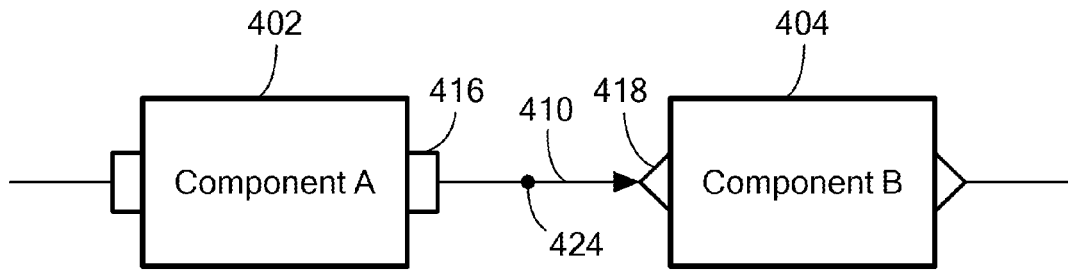
FIG. 4C is a collection port to scalar port connection between two components, including an execution set entry point.

When there is a mismatch between the port types on either end of a link, there is an implicit change in a level of the execution set hierarchy. In particular, mismatched ports represent entry points or exit points to an execution set at a particular level of the execution set hierarchy. In some examples, an execution set entry point is defined as a link between a collection type output port and a scalar type input port. In FIG. 4C, one example of an execution set entry point 424 is illustrated at the link 410 between component A 402 and component B 404, since the output port 416 of component A 402 is a collection type port and the input port 418 of component B 404 is a scalar type port.

Figure 4D:
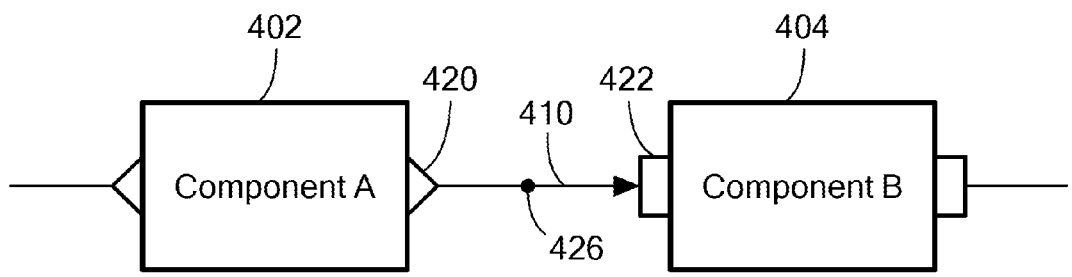
FIG. 4D is a scalar port to collection port connection between two components, including an execution set exit point.

In some examples, an execution set exit point is defined as a link between a scalar type output port and a collection type input port. Referring to FIG. 4D, one example of an execution set exit point 426 is illustrated at the link 410 between component A 402 and component B 404, since the output port 420 of component A 402 is a scalar type port and the input port 422 of component B 404 is a collection type port.

The assignment algorithm implemented prior to compilation and/or interpretation by the compiler/interpreter 120 uses execution set entry and execution set exit points to discover the execution sets present in the data processing graph.

2.1 Stack Based Assignment Algorithm

For illustration purposes, in a first example, a data processing graph has a simple, one dimensional graph structure, and a simpler assignment algorithm is illustrated using a stack based algorithm. In the stack based assignment algorithm, each component in the data processing graph is labeled with one or more "ID strings," which are made up of integers separated by a separation character '/'. The number of times the separation character '/' appears in the ID string for a given component determines the level of the component in the execution set hierarchy. In some examples, a component may have multiple input links and therefore may have multiple ID strings. In such cases, the algorithm has rules, described in greater detail below, for determining which ID string to use.

In one example of the stack based assignment algorithm, the compiler/interpreter 120 walks the data processing graph, in an upstream to downstream direction, according to the following procedure. Initially, the most upstream component(s) are labeled with an ID string of '0' indicating it is a component at the root level of the execution set hierarchy.

The links and components on a path from the most upstream component to the most downstream component are then traversed. If a link between a collection type output port of an upstream component and a collection type input port of a downstream component is encountered, the ID string of the upstream component is propagated to the downstream component. Similarly, if a link between a scalar type output port of an upstream component and a scalar type input port of a downstream component is encountered, the ID string of the upstream component is propagated to the downstream component.

If a link between a collection type output port of an upstream component and a scalar type input port of a downstream component is encountered, the downstream component is assigned a label including the label of the upstream component with '/n' appended to its end, where n is 1+<max of all existing ID string integers>. If a link between a scalar type output port of an upstream component and a collection type input port of a downstream component is encountered, the downstream component is assigned a label including the label of the upstream component with its right-most ID string integer (and its separation character '/') removed.

In some examples, various conditions may be considered illegal and will cause an error in the algorithm (e.g., if a component has two different ID strings at the same level of the execution set hierarchy, or the presence of a cycle in an execution set).

Figure 5:
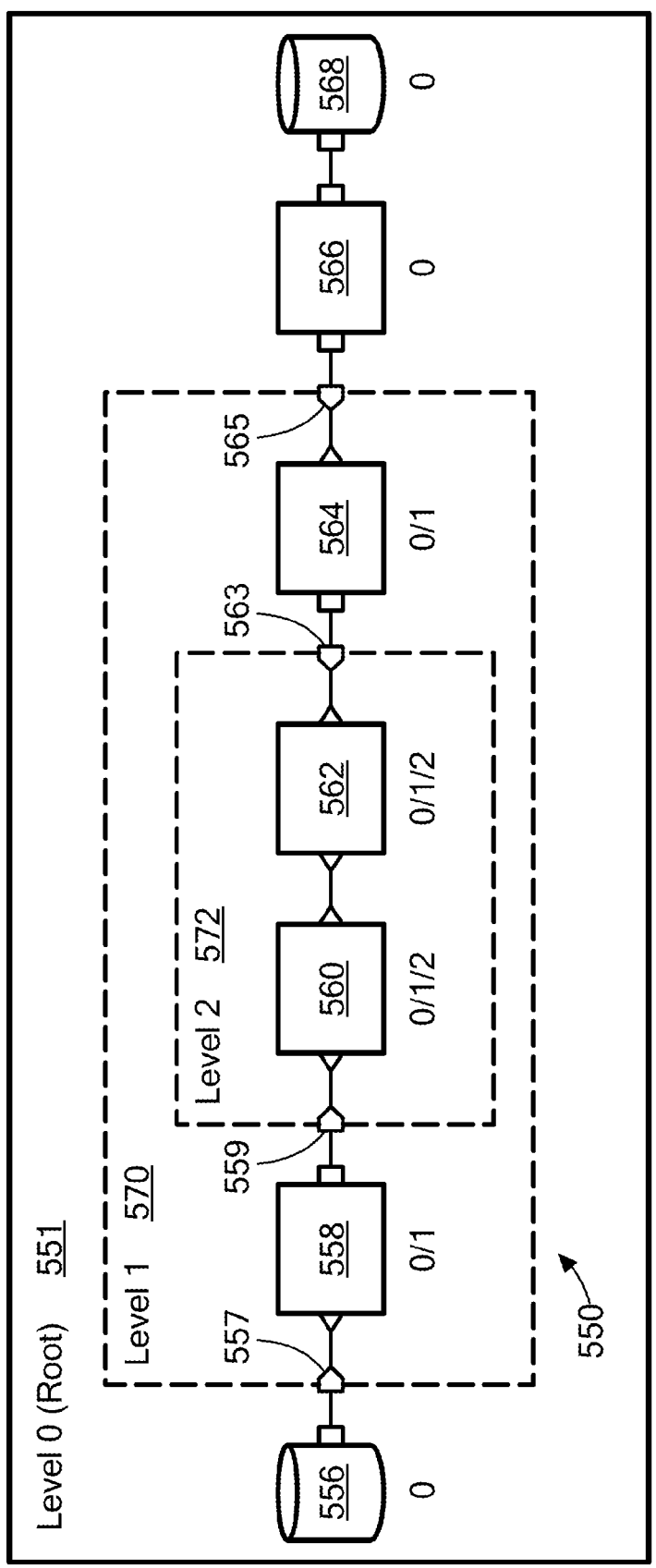
FIG. 5 is a data processing graph with a stack based assignment algorithm applied.

Referring to FIG. 5, the stack based assignment algorithm described above is applied to an exemplary data processing graph 550, resulting in the discovery of two execution sets (in addition to a Root, "Level 0" execution set 551): a first "Level 1" execution set 570 and a second "Level 2" execution set 572 nested within the first "Level 1" execution set 670. To arrive at the discovery of the two execution sets 570, 572, the stack based assignment algorithm first labels the most upstream component, a first dataset 656, with an ID string of '0.' The stack based assignment algorithm then traverses the components and of the one dimensional path through the data processing graph 550. In traversing the path, the stack based assignment algorithm first traverses the link from the first dataset 556 to a first component 558. Since the output port of the first dataset 556 is a collection type output port and the input port of the first component 558 is a scalar type input port, the first component 558 is assigned an ID string of '0/1' which is the ID string of the first dataset 556 with '/1' appended to its end, where 1 is the max of all existing ID string integers +1. In general, appending '/1' to the ID string of the first component 558 is an indication of a transition from the Root, "Level 0" execution set 551 to the "Level 1" execution set 570. In some examples, this transition is represented using a first execution set entry point indicator 557.

The assignment algorithm then traverses the link from the first component 558 to a second component 560. Since the output port of the first component 558 is a collection type output port and the input port of the second component 560 is a scalar type input port, the second component 560 is assigned an ID string of '0/1/2' which is the ID string of the first component 558 with '/2' appended to its end, where 2 is the max of all existing ID string integers +1. In general, appending '/2' to the ID string of the second component 560 is an indication of a transition from the "Level 1" execution set 570 to the "Level 2" execution set 572. In some examples, this transition is represented using a second execution set entry point indicator 559.

The assignment algorithm then traverses the link from the second component 560 to a third component 562. Since the output port of the second component 560 is a scalar type output port and the input port of the third component 562 is a scalar type input port, the ID string (i.e., '0/1/2') of the second component 560 is propagated to the third component 562.

The assignment algorithm then traverses the link from the third component 562 to a fourth component 564. Since the output port of the third component 562 is a scalar type output port and the input port of the fourth component 564 is a collection type input port, the fourth component is assigned an ID string of '0/1' which is the ID string of the third component 562 with its right-most ID string of '2' (and its separation character '/') removed. In general, removing the '/2' from the ID string of the third component 562 is an indication of a transition from the "Level 2" execution set 572 to the "Level 1" execution set 570. In some examples, this transition is represented using a first execution set exit point indicator 563.

The assignment algorithm then traverses the link from the fourth component 564 to a fifth component 566. Since the output port of the fourth component 564 is a scalar type output port and the input port of the fifth component 566 is a collection type input port, the fifth component 566 is assigned an ID string of '0' which is the ID string of the fourth component 564 with its right-most ID string integer (and its separation character '/') removed. In general, removing the '/1' from the ID string of the fourth component 564 is an indication of a transition from the "Level 1" execution set 570 to the Root, "Level 0" execution set 551. In some examples, this transition is represented using a second execution set exit point indicator 565.

Finally, the assignment algorithm traverses the link from the fifth component 566 to a second dataset 568. Since the output port of the fifth component 566 is a collection type output port and the input port of the second dataset 568 is a collection type input port, the ID string of the fifth component 566 (i.e., '0') is propagated to the second dataset 568.

In some examples, in addition to entry point indicators and exit point indicators, the change between the flow of collections of data elements and individual scalar data elements can be visually represented using additional visual cues within the user interface. For example, the line representing a link can be thicker between a collection port and an indicator and thinner between an indicator and a scalar port.

The result of the stack based assignment algorithm includes a version of the data processing graph 550 where each of the components is labeled with an ID string. In the example of FIG. 5, the first dataset 556, the second dataset 568, and the fifth component 566 are all labeled with the ID string '0.' The first component 558 and the fourth component 564 are labeled with the ID string '0/1.' The second component 560 and the third component 562 are each labeled with the ID string '0/1/2.'

Each unique ID string represents a unique execution set in the execution set hierarchy. Those components with the ID string '0' are grouped into the Root, "Level 0" execution set 551 in the execution hierarchy. Those components with the ID string '0/1' are grouped into the "Level 1" execution set 670, which is nested within the root execution set 651 (where '0/1' can be read as execution set 1 nested within execution set 0). Those components with the ID string '0/1/2' are grouped into a "Level 2" execution set 572, which is nested within both the Root, "Level 0" execution set 551 and the "Level 1" execution set 570.

2.2 Global Mapping Based Assignment Algorithm

In some examples, for more general data processing graphs, the stack based assignment algorithm may not be sufficient for correctly determining the execution set hierarchy. For example, in general data processing graphs, any given component can have multiple input ports and/or multiple output ports, rendering general data processing graphs incompatible with the stack based approach. In such examples, a global mapping based assignment algorithm is used to determine the execution set hierarchy.

The global mapping based assignment algorithm leverages the fact that data processing graphs are constrained to be directed acyclic graphs. Directed acyclic graphs can be processed using a topological sorted order, ensuring that each component of the graph is only processed after all of the components immediately upstream of the component have been processed. Since all of the components immediately upstream of the component are known to have been processed, the ID string for the component can be determined by choosing the ID string of the most deeply nested (in the execution set hierarchy) component that is directly upstream from the component.

In some examples, the global mapping based assignment algorithm uses a standard topological sorting algorithm such as Kahn's algorithm to obtain a topological sorted order for a given data processing graph. Kahn's algorithm is summarized by the following pseudo-code:

```
L ← Empty list that will contain the sorted elements
S ← Set of all nodes with no incoming edges
while S is non-empty do
    remove a node n from S
    add n to tail of L
    for each node m with an edge e from n to m do
        remove edge e from the graph
        if m has no other incoming edges then
            insert m into S
if graph has edges then
    return error (graph has at least one cycle)
else
    return L (a topologically sorted order)
```

After determining the topological sorted order, the global mapping based assignment algorithm traverses the components of the data processing graph in the topological sorted order to determine the proper ID string (or simply an ID number) for each of the components. In particular, as the components are traversed, every component of the data processing graph copies its ID string to its output port. Components that are immediately downstream from an upstream component and are not separated from the upstream component by an execution set entry point or an execution set exit point read the ID string from the upstream component's output port and use the ID string as their ID string.

For an upstream component that is separated from a downstream component by an execution set entry point, a new ID string is allocated at the execution set entry point and is provided to the downstream component for use as its ID string. A mapping of the ID string of the upstream component to the ID string of the downstream component (i.e., a parent/child mapping) is stored in a global mapping data store for later use.

For an upstream component that is separated from a downstream component by an execution set exit point, the ID string at the output port of the upstream component is read by the execution set exit point. The global mapping data store is then queried to determine the parent ID string for the ID string at the output port. The parent ID string is provided to the downstream component for use as its ID string.

Figure 6:
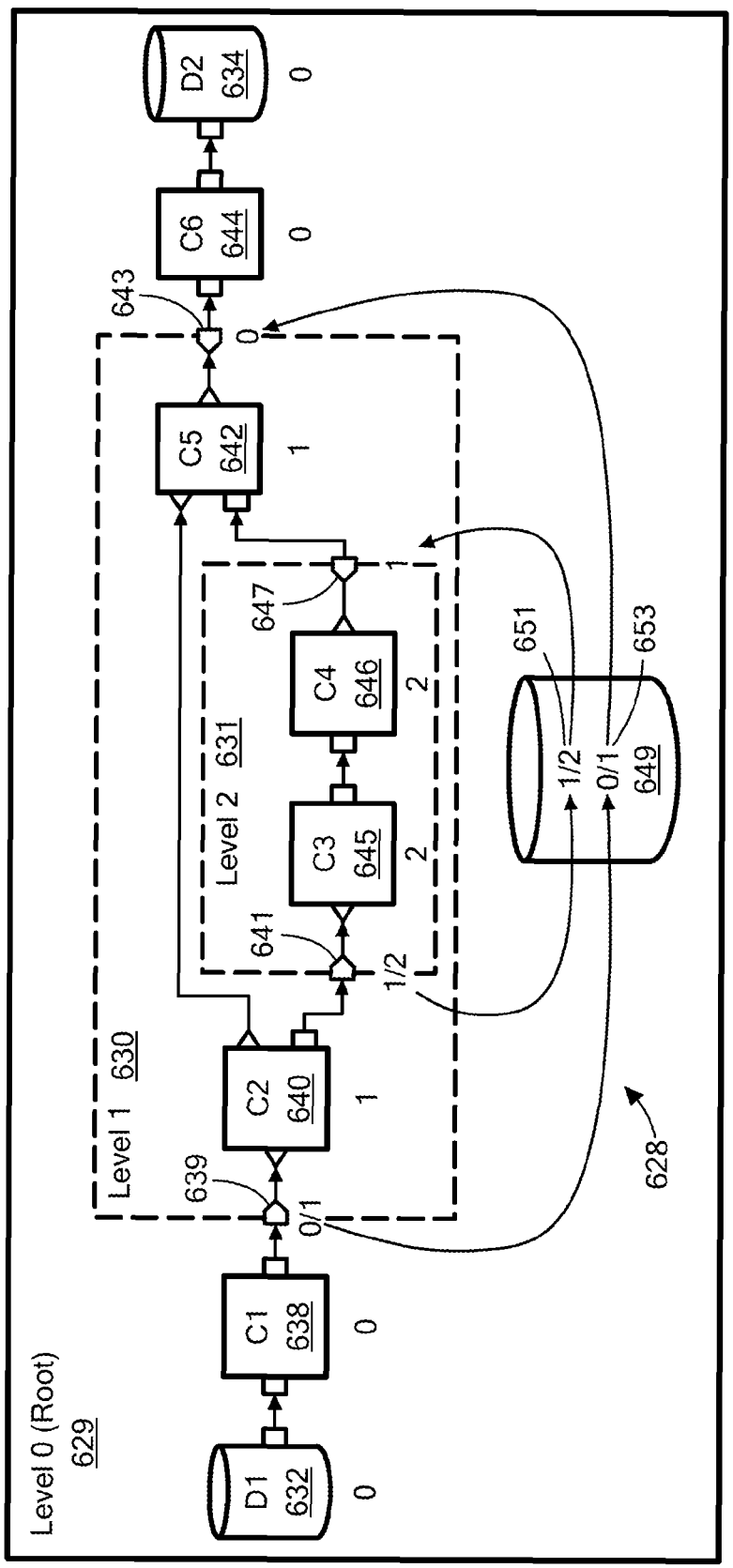
FIG. 6 is a data processing graph with a global mapping based assignment algorithm applied.

Referring to FIG. 6, one example of an exemplary general, two dimensional data processing graph 628 is analyzed using the global mapping based assignment algorithm described above. The data processing graph 628 includes a first dataset (D1) 632, a first component (C1) 638, a second component (C2) 640, a third component (C3) 645, a fourth component (C4) 646, a fifth component (C5) 642, a sixth component (C6) 644, and a second dataset (D2) 634. Before assigning to ID strings to individual components of the data processing graph 628, a topological sorting algorithm (e.g., Kahn's algorithm) is applied to the data processing graph, resulting in a topological sorted order of: D1, C1, C2, C3, C4, C5, C6, D2.

With the topological sorted order determined, the global mapping based assignment algorithm traverses the components of the data processing graph in the topological sorted order to determine the proper ID string for each of the components, resulting in the discovery of a "Level 1" execution set 630 and a "Level 2" execution set 631 (in addition to the Root, "Level 0" execution set). To arrive at the discovery of the two execution sets 630, 631, the global mapping based assignment algorithm first labels the most upstream component, a first dataset (D1) 632, with an ID string of '0.' The stack based assignment algorithm then traverses the components and links of the data processing graph 628 in the topological sorted order.

The global mapping based assignment algorithm first traverses the link from the first dataset (D1) 632 to the first component (C1) 638. Since the output port of the first dataset (D1) 632 is a collection type output port and the input port of the first component (C1) 638 is a collection type input port, no execution set entry point or exit point is identified and the ID string (i.e., '0') of the first dataset (D1) 632 is read from the output port of the first dataset (D1) 632 and assigned to the first component (C1) 638.

The assignment algorithm then traverses the link between the first component (C1) 638 and the second component (C2) 640. Since the output port of the first component (C1) 638 is a collection type output port and the input port of the second component (C2) 640 is a scalar type input port, a first execution set entry point 639 is identified between the two components 638, 640. At the first execution set entry point 639, a new ID string (i.e., '1') is allocated and assigned as the ID string of the second component (C2) 640. A mapping 653 of the parent ID string (i.e., '0') for the first execution set entry point 639 to the child ID string (i.e., '1') for the first execution set entry point 639 is stored in a global mapping data store 649 for later use.

The assignment algorithm then traverses the link from the second component (C2) 640 to the third component (C3) 645. Since the output port of the second component (C2) 640 is a collection type output port and the input port of the third component 645 is a scalar type input port, a second execution set entry point 641 is identified between the two components 640, 645. At the second execution set entry point 641, a new ID string (i.e., '2') is allocated and assigned as the ID string of the third component (C3) 645. A mapping 651 of the parent ID string (i.e., '1') for the second execution set entry point 641 to the child ID string (i.e., '2') for the second execution set 641 is stored in the global mapping data store 649 for later use.

The assignment algorithm then traverses the link from the third component (C3) 645 to the fourth component (C4) 646. Since the output port of the third component (C3) 645 is a collection type output port and the input port of the fourth component (C4) 646 is a collection type input port, no execution set entry or exit points is identified and the ID string (i.e., '2') of the third component (C3) 645 is read from the output port of the third component (C3) 645 and assigned to the fourth component (C4) 646.

The assignment algorithm then traverses the link from the fourth component (C4) 646 to the fifth component (C5) 642. Since the output port of the fourth component (C4) 646 is a scalar type output port and the input port of the fifth component (C5) 642 is a collection type input port, a first execution set exit point 647 is identified between the two components 646, 642. At the first execution set exit point 647, the ID string of the fourth component (C4) 646 is read from the output port of the fourth component (C4) 646 and is used to query the global mapping data store 649. The global mapping data store 649 returns the parent child relationship 651 (i.e., '1/2') stored in association with the second execution set entry point 641. The parent ID string (i.e., '1') of the parent/child relationship 651 is assigned as the ID string for the fifth component (C5) 642.

The assignment algorithm then traverses the link from the fifth component (C5) 642 to the sixth component (C6) 644. Since the output port of the fifth component (C5) 642 is a scalar type output port and the input port of the sixth component (C6) 644 is a collection type input port, a second execution set exit point 643 is identified between the two components 642, 644. At the second execution set exit point 643, the ID string of the fifth component (C5) 642 is read from the output port of the fifth component (C5) 642 and is used to query the global mapping data store 649. The global mapping data store 649 returns the parent/child relationship 653 (i.e., '0/1') stored in association with the first execution set entry point 639. The parent ID string (i.e., '0') of the parent/child relationship 653 is assigned as the ID string for the sixth component (C6) 644.

Finally, the assignment algorithm traverses the link from the sixth component (C6) 644 to the second dataset (D2) 634. Since the output port of the sixth component (C6) 644 is a collection type output port and the input port of the second dataset (D2) 634 is a collection type input port, no execution set entry point or exit point is identified and the ID string (i.e., '0') of the sixth component (C6) 644 is read from the output port of the sixth component (C6) 644 and assigned to the second dataset (D2) 634.

The result of the global mapping based assignment algorithm includes a version of the data processing graph 628 where each of the components is labeled with an ID string. In the example of FIG. 6, the first dataset (D1) 632, the first component (C1) 638, the sixth component (C6) 644, and the second dataset (D2) 634 are all labeled with the ID string '0.' The second component (C2) 640 and the fifth component (C5) 642 are both labeled with the ID string '1.' The third component (C3) 645 and the fourth component (C4) 646 are both labeled with the ID string '2.'

Each unique ID string represents a unique execution set in the execution set hierarchy. Those components with the ID string '0' are grouped into the Root, "Level 0" execution set 629 in the execution hierarchy. Those components with the ID string '1' are grouped into a "Level 1" execution set 630, which is nested within the root execution set 629. Those components with the ID string '2' are grouped into the "Level 2" execution set 631, which is nested within the Root, "Level 0" execution set 629 and further within the "Level 1" execution set 630.

2.3 User Defined Execution Sets

Figure 7:
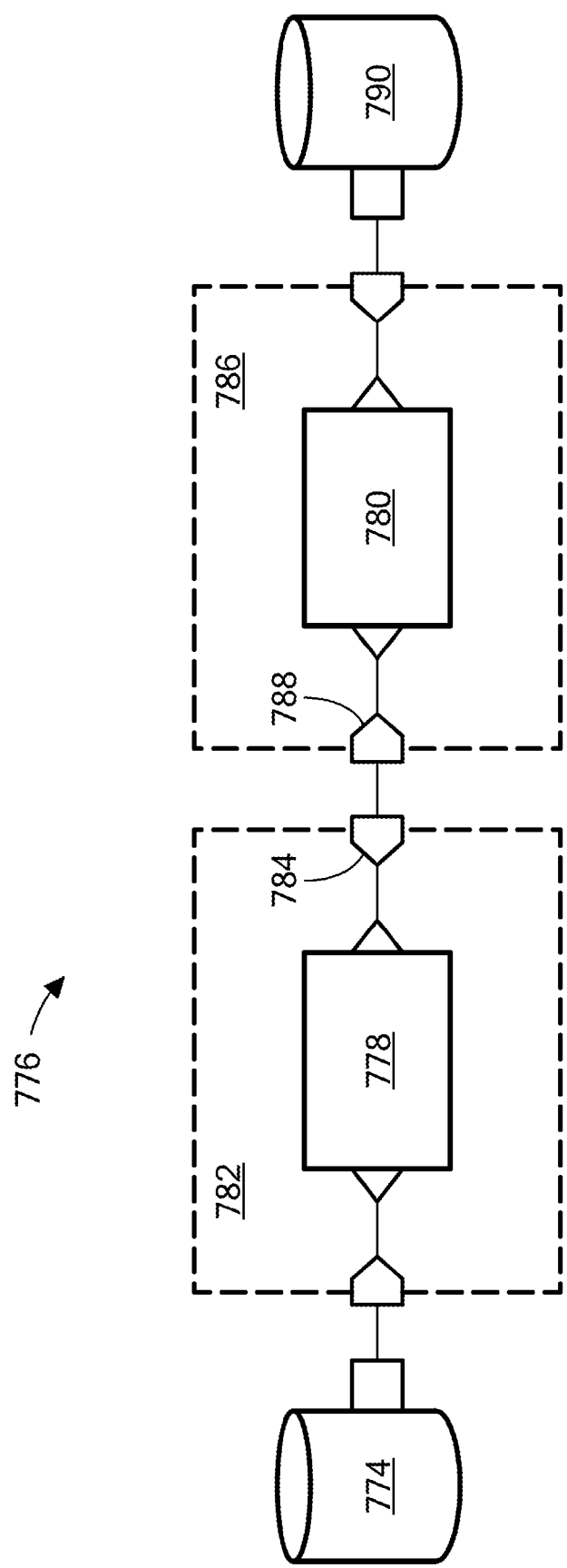
FIG. 7 is a data processing graph with user defined execution sets.

In the examples described above, assignment algorithm(s) are used to automatically discover the execution sets present in a data processing graph without any user intervention. However, in some examples, a user may require functionality other than the functionality afforded by the assignment algorithm(s). In such cases, a user can explicitly add execution set entry points and exit points to explicitly define where execution sets begin and/or end. Referring to FIG. 7, a data processing graph 776 includes a first dataset 774, a first component 778, a second component 780, and a second dataset 790. Applying the assignment algorithm(s) described above to the data processing graph 776 would result in the discovery of a single execution set including the first component 778 and the second component 780. However, in this case, the user has explicitly defined two execution sets (i.e., a first execution set 782 and a second execution set 786) for the data processing graph 776. In particular, the user has inserted an execution set exit point component 784 into a link coming out of an output port of the first component 778 and has inserted an execution set entry point 788 into the link going into an input port of the second component 780. By adding the execution set exit point 784 and the execution set entry point 788 to the link between the first component 778 and the second component 780 the user has essentially broken what was a single execution set into two separate execution sets 782, 786.

In some examples, the user defines all of the execution set entry and exit points for a data processing graph. In other examples, the user defines some of the execution set entry and exit points and then leaves it to the assignment algorithm(s) to discover the remaining execution set entry points and exit points for the data processing graph.

2.4 Same Set as Relationships

In some examples, a user may wish to explicitly designate to which execution set a given component belongs. For example, referring to FIG. 8A, data processing graph 892 includes a first execution set 894 which receives data elements from a create data component 896 and a read table component 898. These components are similar to an input file component except they have different sources for the collection of data elements that they provide. For the create data component 896, instead of a scalar input port that specifies a file location, there is an (optional) scalar input port that specifies a number of records data elements to be produced, and there is also a parameter that specifies how each data element is to be generated. For the read table component 898, instead of a scalar input port that specifies a file location, there is an (optional) scalar input port that specifies a table in a database. The first execution set 894 includes a first component 891 and a second component 893 which together process the data elements from the create data component 896 and the read table component 898 to generate an output that is provided to a first dataset 899.

Figure 8A:
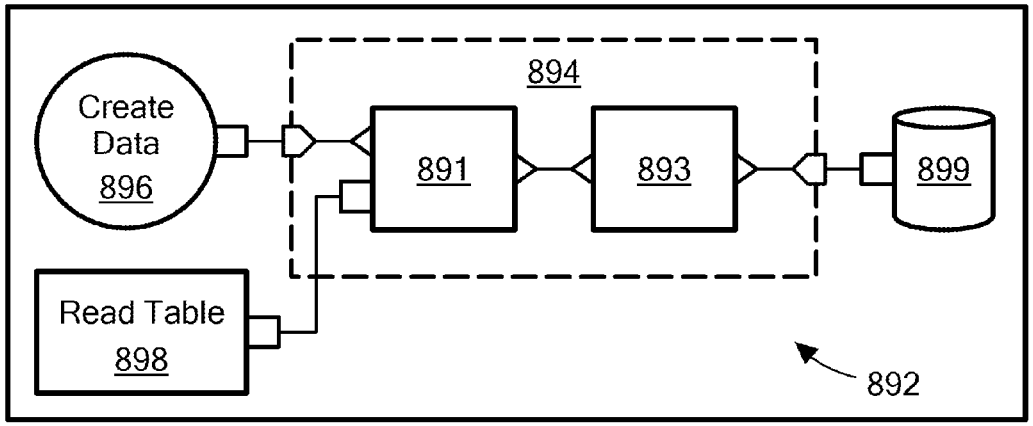
FIG. 8A and FIG. 8B illustrate a "same set as" relationship in a data processing graph.

In FIG. 8A, the read table component 898 is external to the first execution set 894 meaning that it is run once and outputs a collection of data elements from its collection type output port. The collection of data elements traverses the boundary of the first execution set 894 and is provided to a collection type input port on the first component 891. For each parallel instance of the components in the execution set 894, a copy of the collection of data elements at the collection type input port on the first component 891 is created. Generally, whether a link is from a collection port, a scalar port, or a control port, a link between components that are assigned to different execution sets will have the data or control elements copied to all instances for links flowing into an execution set, and will have the data or control elements gathered from all instances for links flowing out of an execution set. Data elements are gathered into a collection and control elements are gathered into a vector, which may be handled appropriately (including possibly flagging it as an error) depending on the control logic of the downstream component.

Figure 8B:
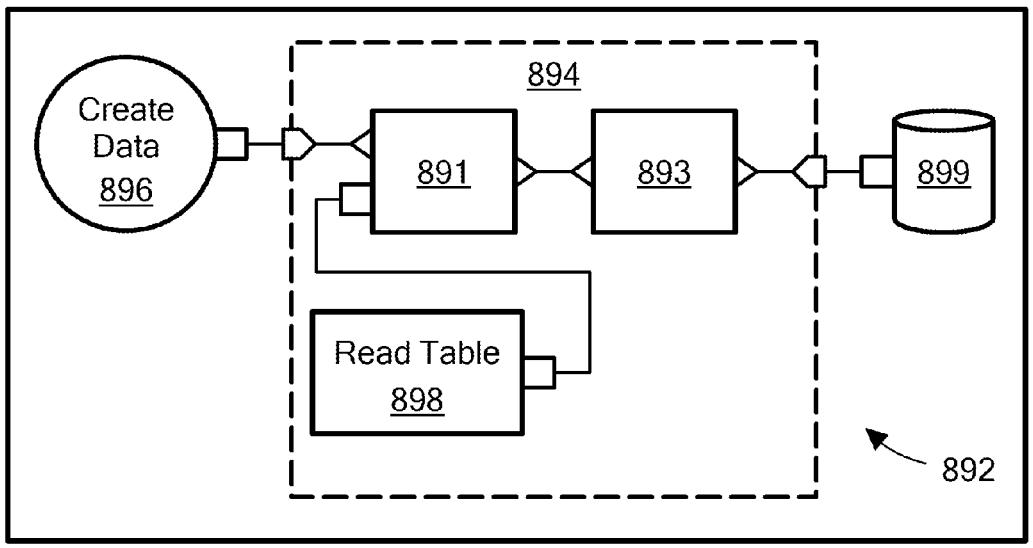

Referring to FIG. 8B, in some examples, a user may require that the read table component 898 is executed for each parallel instance of the components in the execution set 894. To achieve this functionality, the user can specify a "same set as" relationship between the read table component 898 and the first component 891. As a result of the user specifying the "same set as" relationship, the read table component 898 is moved into the same execution set (i.e., the first execution set 894) as the first component 891. Since the read table component 898 is included in the first execution set 894, each parallel instance of the components in the first execution set 894 executes an instance of the read table component 898.

In some examples, the user can specify the "same set as" relationship by selecting a destination execution set from a menu associated with a source execution set, or by dragging a component from a source execution set to a destination execution set (e.g., via a user interface described in greater detail below). In some examples, error checking is performed to verify that the dragged component can legally be located in the destination execution set. For example, one possible requirement that can be enforced on any two components that are to have a "same set as" relationship to each other is that there must be at least one path through the data processing graph that includes both of those components.

2.5 Collection Data Replication

In some examples, multiple components in an execution set may each have scalar input ports connected to a single collection output port of an upstream component via an execution set entry point. Similarly, multiple components in an execution set may each have scalar output ports connected to a single collection input port of a component downstream from the execution set.

In some examples, to provide the same data from a collection type output port to the scalar input ports of multiple components, an execution set entry point creates replica(s) of each data element from the collection for each of the scalar input ports and provides the replica(s) to their corresponding scalar input ports. Similarly, to merge data output by the scalar output ports of multiple components (from different respective iterations of the execution set), an execution set exit point can receive output data elements from the scalar output ports, merge the output data elements, and then provide the merged output data elements to the collection input port of the downstream component. In general, the collection input port of the downstream component is configured to handle merged data elements.

Figure 9:
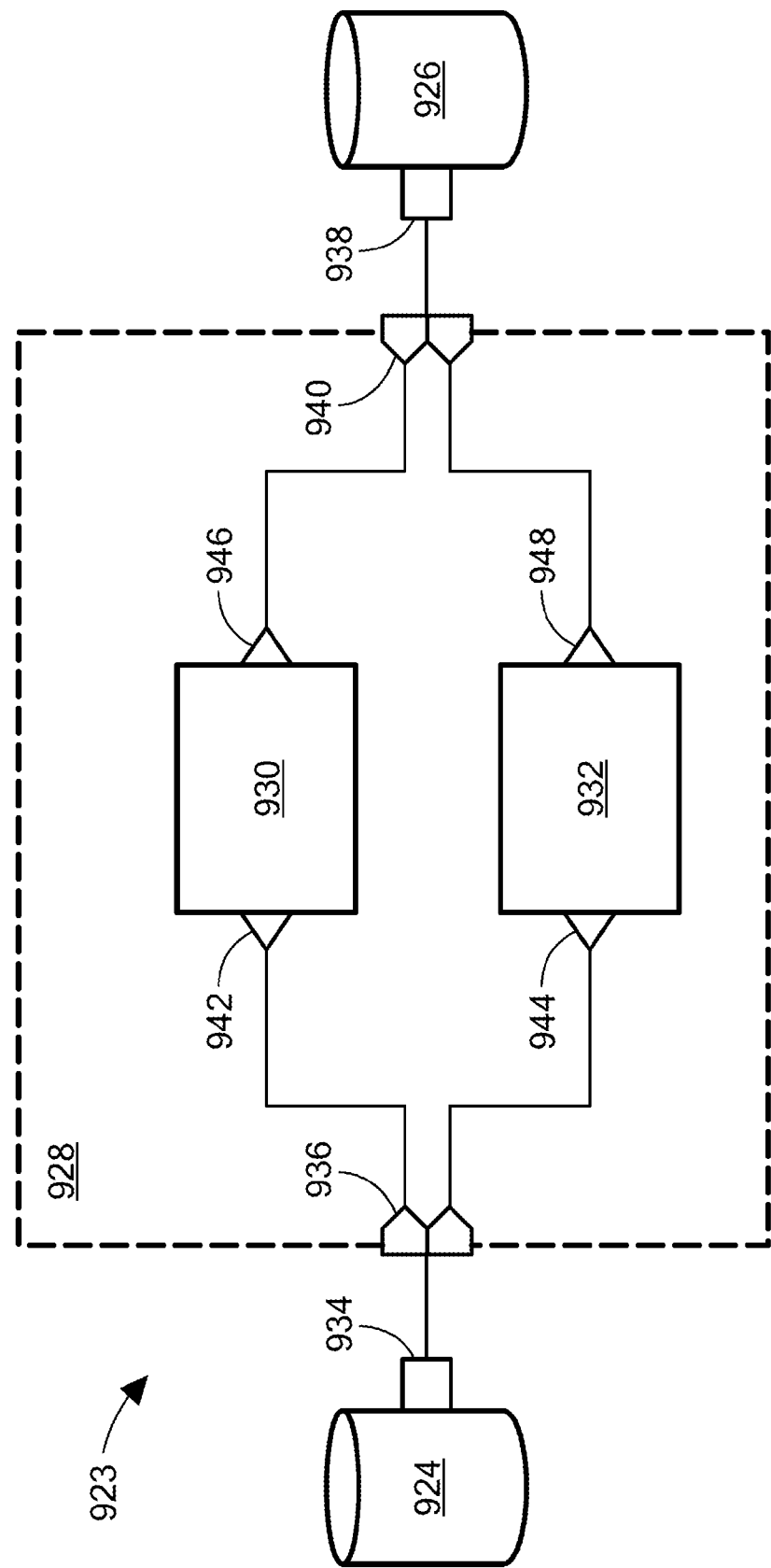
FIG. 9 is a data processing graph with an entry point that replicates data elements.

Referring to FIG. 9, a data processing graph 923 includes a first dataset 924, a second dataset 926, and an execution set 928. The execution set 928 includes two components: a first component 930 and a second component 932. The first dataset 924 has a collection output port 934 that is connected to and provides a collection of data elements to an execution set entry point 936 of the execution set 928. The second dataset 926 has a collection input port 938 that is connected to and receives a collection of data elements from an execution set exit point 940 of the execution set 928.

Within the execution set 928, the first component 930 has a first scalar input port 942 and the second component 932 has a second scalar input port 944. Both the first scalar input port 942 and the second scalar input port 944 are connected to and receive individual data elements of from the execution set entry point 936. As is described above, the execution set entry point 936 replicates data elements received from the collection output port 934 to provide an copy of each data element of a collection of data elements to each scalar input port connected to the execution set entry point 936. In FIG. 9, the execution set entry point 936 creates two replicas of each data element and provides one of the replicas to the first scalar input port 942 and the other replica to the second scalar input port 944. As is apparent from the figure, in some examples a visual representation of the execution set entry point 936 in a graphical user interface provides a representation of how many replicas of a data element are created by the execution set entry point 936. Also, in other examples, the different entry point indicators representing different copies of the replicas can be separated and distributed around the border of the execution set into as many components as there are within the execution set that need a copy of each replicated data element provided from the collection output port feeding the execution set.

The first component 930 and the second component 932 process their respective data elements and provide their respective processed data elements to the execution set exit point 940 via scalar output ports 946, 948. In some examples, the execution set exit point 940 groups the processed data elements into pairs and outputs the pairs of processed data elements to the collection input port 938 of the second dataset 926. As is apparent from the figure, in some examples a visual representation of the execution set exit point 940 in a graphical user interface provides a representation of how many replicas of a data element are grouped by the execution set entry point 936.

2.6 Resource Latching

In some examples, components in a given execution set may be run multiple times in parallel instances. In some examples, the components running parallel instances may need to access a shared resource. To prevent race conditions and other problems related to multiple processes accessing a shared resource, a latching mechanism may be used. In general, the latching mechanism allows one instance of the components in an execution set to obtain a runtime lock on the shared resource for the time that it takes the instance to finish running. While an instance has a shared resource latched, only the components in the instance have access to the shared resource and the components of other instances must wait for the latch to be released. After the instance has completed, it releases the runtime lock, allowing other instances to access the shared resource. The latching mechanism must both latch and unlatch the shared resource within a single execution set (e.g., using an explicit latch component at the upstream end and an explicit unlatch component at the downstream end). In some embodiments, such "latched execution sets" cannot be nested nor can they overlap one another.

2.7 Miscellaneous

It is noted that, while the global mapping based assignment algorithm is described in relation to a two dimensional data processing graph, it can also be used to discover execution sets for one dimensional data processing graphs.

In general, execution sets can be arbitrarily nested.

In general, an execution set has at most one driving data element that is received for each instance of the execution set from a linked output collection port. However, multiple scalar input ports may receive that same data element if it is explicitly or implicitly replicated crossing the boundary of the execution set.

In general, all output scalar ports that have links crossing the boundary of an execution set have all data elements, from each of multiple instances of the execution set, gathered into the same collection provided to a linked input collection port. But, if the execution set only has a single instance, the output scalar ports that have links crossing the boundary of the execution set may be linked to an input scalar port.

In general, a link between two ports of the same type can traverse an execution set boundary, assuming that the traversal of the execution set does not cause any cycles in the data processing graph.

In some examples, each execution set is assigned a unique identifier (e.g., a '1') by default. In other examples, each execution set may be assigned an execution set ID path (e.g., '1/3/6'). In some examples, a user explicitly supplies an execution set ID string. The execution set ID string is not necessarily unique. In the case that an execution set ID string is not unique, the execution set ID string can be combined with the execution set ID strings of its parent, grandparent, and so on, resulting in a unique ID string.

In some examples, the global mapping based assignment algorithm results in components being assigned an ID string that corresponds to the most deeply nested execution set. In some examples, when execution sets are assigned execution set ID paths, the execution set ID paths are not necessarily unique. To compensate for situations where execution set ID paths are not unique, a constraint is placed on the execution set ID paths requiring that the execution set ID paths upstream of a given execution set, must be "compatible," where two execution set ID paths are compatible if and only if they are the same, or one is a proper prefix of the other. For example:

/1/2/3 and /1/2/3 are compatible
/1/2/3 and /1/2 are compatible
/1/2 and /1/2/3 are compatible
/1/2/3 and /1 are compatible
/1/2/3 and /1/4 are not compatible
/1/2/3 and /1/4/5 are not compatible The embodiments described above impose essentially no ordering/concurrence constraints on execution of instances of the scalar blocks. But, in some embodiments, other inputs are provided to control permissible concurrency and required serialization of subsets of the data elements that are received from the collection feeding the execution set. In some embodiments, sequential processing according to a partial ordering may be imposed on some subsets of data elements.

By default the instances of an execution set may run fully parallel. However, in some cases, a user may desire different behavior. For example, if the data being processed is account-level data, the user may want to enforce certain restrictions on processing the data within each account. For example, the user may want to enforce serial execution. In such a case, any degree of parallelism may be permitted across accounts, but two data elements for the same account must not be processed at the same time (i.e., concurrently). Optionally, an additional restriction may be in-order processing, such that two data elements for the same account must not be processed out of order according to an order defined by a key, or by a received order, for example.

To accomplish this, a serialization key may be provided for an execution set. All data elements with the same value of the serialization key must be processed serially, and in some cases in a well-defined order. One way for the runtime system to enforce serial execution for data elements with the same serialization key is to partition execution set instances by serialization key: assigning instances whose driving data element has a particular serialization key (or hash value of the serialization key) to be executed on a particular computing node 152. At runtime, the system can ensure that work is evenly distributed across computing nodes 152 by scanning a collection of data elements to ensure queues of runnable tasks remain full. In a case in which there is not necessarily an explicitly defined order (such as in a collection), the order may be the same order as they were produced from an output port (even a collection output port) or an order associated with a different collation key that governs the order of processing within a serialization key group. In some cases, an execution set may be forced to run entirely serially by providing a predefined value as the serialization key.

In some embodiments, an appearance that order has been preserved can be maintained, even if processing has not been performed strictly according to that order. If data at both the input and the output of an execution set are associated with a particular order (e.g., an order of elements within a vector), a user may wish to preserve that order. Even without serialization in the processing of data elements, output data elements can be sorted to restore an ordering associated with a corresponding set of input data elements, using an ordering key carried along with the data elements as they are processed, for example. Alternatively, output data elements that were produced in parallel may be merged in the same order in which they entered an execution set, without necessarily requiring an explicit sort operation to be performed.

Various computational characteristics associated with executing code prepared for execution sets can be configured by the compiler/interpreter 120, with or without input from a user. For example, the embedded information described above for indicating how tasks corresponding to components within a particular execution set are to be performed may include any of the following. The information may include a compiler annotation that indicates tasks are to be performed completely serially (i.e., no parallelism). The information may include a compiler annotation that indicates tasks are to be performed with as much parallelism as is allowed by the sequencing constraints. The information may include a compiler annotation that indicates tasks related to the same key value are performed serially and tasks related to different key values are performed in parallel (i.e., serialization by key, as described above).

Compiler annotations or modifiers can be used to indicate any of a variety of computational characteristics:
- concurrency (e.g., parallel, serial, serial by key, as described above)
- precedence between different execution sets (e.g., all tasks of one execution set occur after all tasks of another execution set)
- transactionality (e.g., the tasks of an execution set are processed as a database transaction)
- resource latching (e.g., the tasks of an execution set are performed with a particular resource, such as a shared variable, locked, allowing the tasks to access the resource as an atomic unit)
- ordering (e.g., ordering among data elements is preserved)
- tuple size (e.g., number of data elements to be operated upon by each instance of an execution set)

The compiler/interpreter 120 may determine the characteristics based on automatically analyzing properties of an execution set or of the data processing graph as a whole, and/or based on receiving input from a user (e.g., user annotations within the graph). For example, if key values are referenced in an execution set a compiler annotation may indicate serialization by key. If a resource is used within an execution set, compiler modifiers may enable locking/unlocking that resource before/after the execution set. If there are database operations within an execution set, each instance of the execution set may be configured to execute as a database transaction. If the number of cores available can be determined at compile-time, a compiler annotation may indicate that each core will execute an instance of an execution set on a tuple of data items that consists of a number of data items equal to the total size of the collection divided by number of cores.

The compiler annotations and modifiers can be added to code prepared in the target language, such as a suitable higher-level language (e.g., DML), or lower-level executable code, or a target intermediate form of the data processing graph. For example, the compiler/interpreter 120 may insert components into the data processing graph that explicitly indicate an entry point or exit point to an execution set, or components to begin/end transactions can be placed at entry/exit points of a set of components for processing a transaction, or components can be used to lock/unlock resources. Alternatively, the compiler/interpreter 120 may add a modifier as a modified type of data flow link.

3 User Interface for Data Processing Graphs

In some examples, a user interface allows a user to develop a data processing graph by dragging components onto a canvas and connecting ports of the components together using links. In some examples, the user interface repeatedly applies the assignment algorithm(s) described above to the data processing graph as the user develops the data processing graph. For example, as a user adds a component to the data processing graph being developed, the assignment algorithm(s) may be applied to the graph with the added components. The resulting execution sets discovered by the assignment algorithm(s) can then be displayed as boxes drawn around components in the user interface, for example, or as arbitrarily shaped regions enveloping the components, which can be distinguished by a unique color, shading, texture, or label used to render the region containing components in the same execution set. In some examples, the user can then modify the execution sets discovered by the assignment algorithm(s) by adding or removing components to or from execution sets. In some examples, the assignment algorithm(s) verify that the modified execution sets are legal. For example, there may be some configurations of components and links between various ports that could potentially be divided into execution sets in any of a variety of legal ways. In such ambiguous cases, the assignment algorithm may select one assignment of execution sets by default, but a user may have intended a different assignment of execution sets, in which case the user can modify the assignment (e.g., by inserting an exit point to close an execution set earlier in a chain of components). Alternatively, the assignment algorithm could be configured to recognize ambiguous configurations in which multiple legal assignments are possible, and prompt the user for input to select one.

Figure 10A:
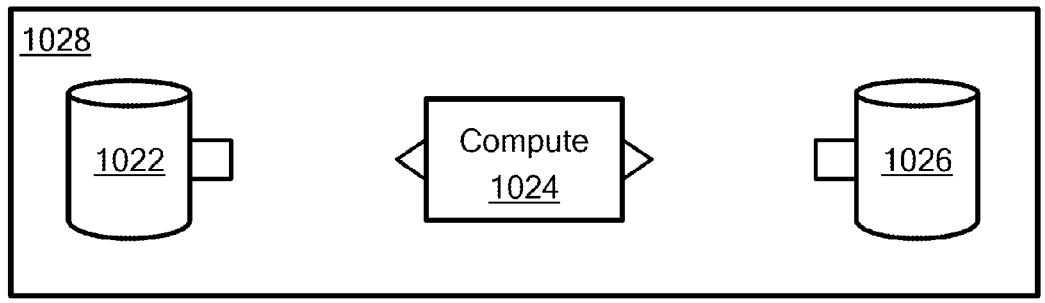
FIGS. 10A-10C illustrate a user interface workflow.

Referring to FIG. 10A, a user has dragged three components, a first dataset 1022, a first compute component 1024, and a second dataset 1026 onto a canvas 1028 of a data processing graph development user interface. The user has not yet connected the ports of the components 1022, 1024, 1026 together using links, and the assignment algorithm(s) have not yet discovered any execution sets in the data processing graph (other than the root execution set).

Figure 10B:
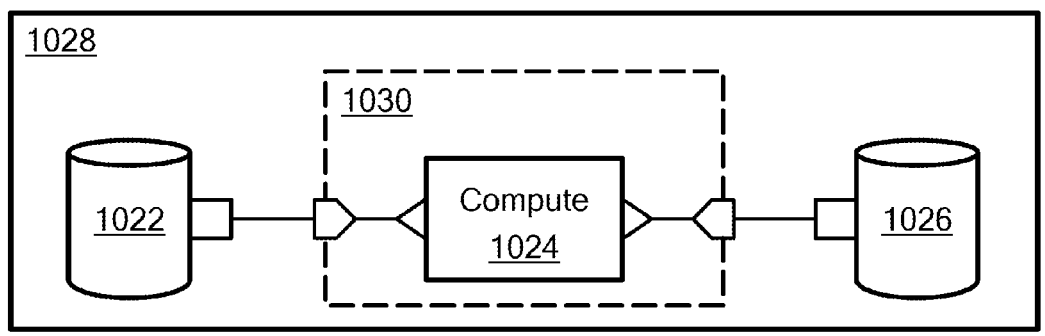

Referring to FIG. 10B, when the user connects the ports of the components 1022, 1024, 1026 together with links, the assignment algorithm(s) automatically discover a first execution set 1030, the first execution set 1030 including the first compute component 1024. The first execution set 1030 is displayed to the user through the user interface. As a user continues to add components and links to the graph, the assignment algorithm(s) automatically discover and display execution sets through the user interface.

Figure 10C:
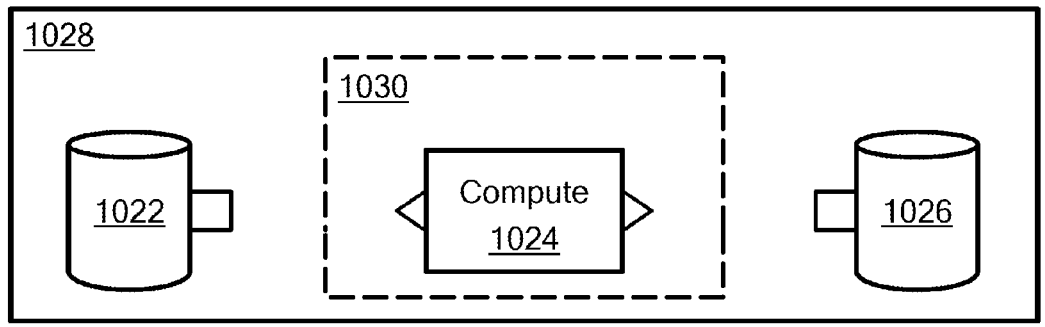

Referring to FIG. 10C, in some examples, a user may need to break the links (e.g., to insert another component into the link). In such examples, if the assignment algorithm(s) were allowed to re-analyze the data processing graph, the first execution set 1030 would be removed, possibly causing disruption and loss of work for the user.

To avoid such a disruption, when the user removes flows or components from the data processing graph, the assignment algorithm(s) may not be executed but instead the remaining components and their execution set associations are left untouched. For example, in FIG. 10C, with its input and output ports disconnected, the first component 1024 is still included in the first execution set 1030. In some examples, when disconnected components are reconnected, the assignment algorithm(s) are permitted to automatically discover and display any execution sets associated with the reconnected components.

In some examples, if a component of a data processing graph does not have an explicit (e.g., user defined) execution set designation, the assignment algorithm(s) are allowed to discover which execution set the component belongs in. Otherwise, if a component has an explicit, user defined execution set designation, the assignment algorithm(s) are not allowed to choose in which execution set the component is included. For example, if a user manually moves a component into a given execution set, the assignment algorithm(s) are not allowed to include the component in any execution set other than the user designated execution set. That is, any user modifications to the data processing graph cannot be overridden by the assignment algorithm(s).

In some examples, the user interface allows a user to use a gesture or other interaction with an input device to promote a component into a given execution set and/or demote a component out of a given execution set. In some examples, the user can promote or demote components using a menu option or other affordance. In other examples, the user can simply drag a component into a desired execution set in the user interface.

In some examples, the user interface allows users to specify one or more constraints for the execution sets in a data processing graph. For example, a user can constrain an execution to run no more than N times parallel at a given time.

In some examples, the compiler/interpreter 120 receives a representation of the data processing graph that includes a mixture of manually defined execution sets and execution sets discovered by the assignment algorithm.

In some examples, a user can define another type of execution set, referred to as an enable/suppress execution set using the interface. For example, a user can draw a box around one or more components that they wish to be included in the enable/suppress execution set. The enable/suppress execution set includes the one or more components and has a scalar input port. If a scalar output port of an upstream component provides one data element to the scalar input port of the enable/suppress execution set, the components in the enable/suppress execution set are allowed to execute. If the scalar output port of the upstream component provides zero data elements to the scalar input port of the enable/suppress execution set, the components included in the enable/suppress execution set are suppressed. Any execution set (including an enable/suppress execution set) can include control input and output ports that can be used to determine whether the entire execution set will be executed or not, and to propagate control signals to other components or execution sets. If an execution set is parallelized (i.e., has multiple instances), then the input control port must be activated before any instance is executed, and the output control port is activated after all instances have completed execution. In some examples, these input and output control ports are provided by placing visual representations of the ports on the border of an execution set. In other examples, these input and output control ports are provided by placing them on an additional component in front of an execution set. For example, this additional "forall component" may be inserted (e.g., automatically by the user interface, or manually by a user) between the upstream collection output data port and the entry point indicator, or in place of the entry point indicator (i.e., between the upstream collection output data port and the driving input scalar data port).

As is noted above in relation to FIG. 7, in some examples, a user can explicitly define execution set entry points and exit points by placing execution set entry point and exit point components along the flows of the data processing graph.

Figure 11A:
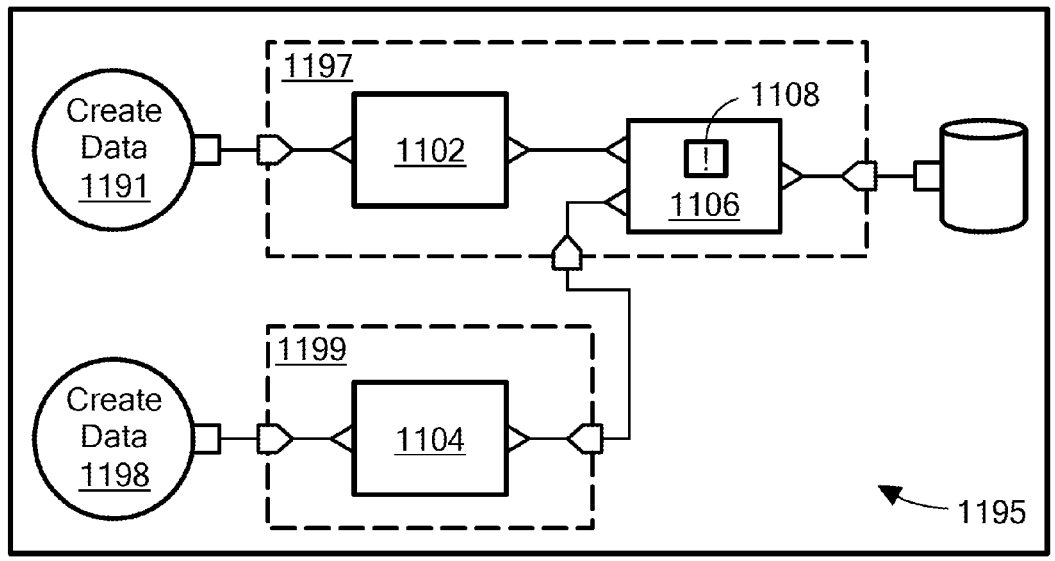
FIG. 11A is a data processing graph with illegal execution sets.

In some examples, the user interface provides real time feedback to notify a user when their graph includes an illegal operation. For example, if there is a conflict caused by the component being in the user designated execution set, the assignment algorithm(s) may issue a warning to the user through the user interface. To provide real time feedback, the assignment algorithm(s) apply validation rules to a data processing graph to inform a user whether the data processing graph is legal. Referring to FIG. 11A, one example of an illegal data processing graph configuration 1195 includes two data sources, a first data source 1191 feeding a first collection of data elements to a scalar port of a first component 1102 in a first execution set 1197 and second data source 1198 feeding a second collection of data elements to a scalar port of a second component 1104 in a second execution set 1199. The second execution set 1199 outputs a third collection of data elements which are then input to a scalar data port of a third component 1106 in the first execution set 1197. Since two different collections of data elements are connected to different scalar ports in the first execution set 1197, there is no way of knowing how many parallel instances of the components in the first execution set 1197 should be instantiated (since one instance of the components is generated for each data element present at the boundary of the first execution set 1197). In some examples, the user is notified of this conflict by displaying an error indicator 1108 on, for example, the second component 1104.

Figure 11B:
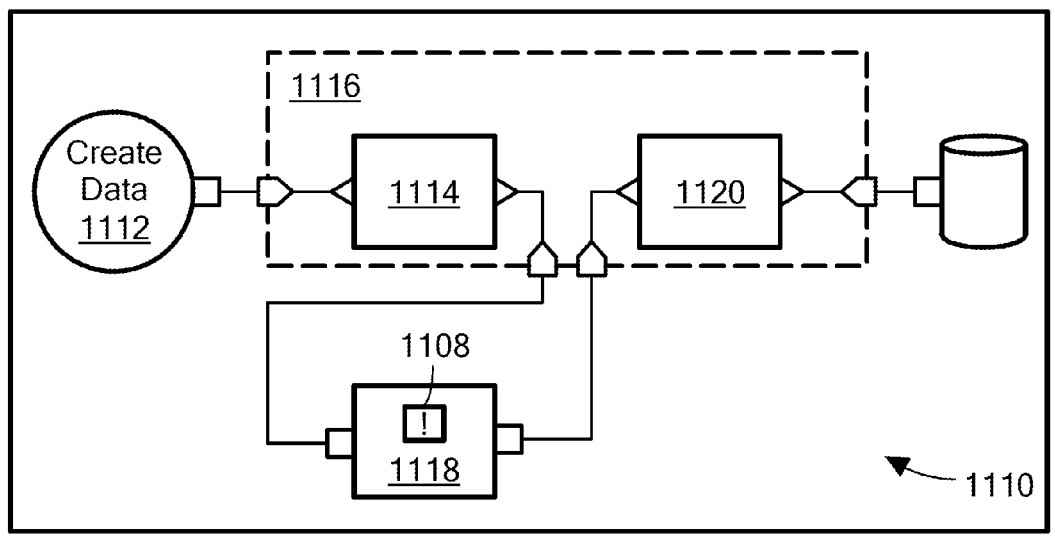
FIG. 11B is a data processing graph with an illegal execution set loop.

Referring to FIG. 11B, another example of an illegal data processing configuration 1110 includes a data source 1112 feeding a collection of data elements to a scalar input port of a first component 1114 in a first execution set 1116. A scalar output of the first component 1114 provides its output, as a collection of data, to a collection port of a second component 1118 outside of the first execution set 1116. The second component 1118 provides a collection of data elements from a collection type output port to a scalar data port of a third component 1120 in the first execution set 1116.

By passing a collection of data elements from the collection type output port of the first component 1114 out of the first execution set 1116, processing the collection of data elements at the second component 1118, and then passing the processed collection of data elements back into the scalar port of the third component 1120, an "execution set loop" is defined.

In general, execution set loops are illegal since they are detrimental to execution ordering. For example, it is generally permissible to have additional flows going into an execution set or coming out of an execution set since, for inputs the input data can be buffered prior to executing the execution set and for outputs the output data can be gathered after the execution set completes execution. However, this is not possible if an external component is required to run both before and after the execution set.

In some examples, the user is notified of execution set loops by displaying an error indicator 1108 on one or more of the components.

In some examples, a data processing graph is considered to be illegal if each execution set entry point is not matched by at least one corresponding execution set exit point. Alternatively, an execution set that has an entry point but no corresponding exit point may be allowed as a user-defined execution set, even if it is not recognized automatically by the assignment algorithm. In those cases, the execution set may end (without providing any output data elements) after the most downstream component(s) finish execution. In some examples, a data processing graph is considered to be illegal if each latch operation is not matched by a corresponding unlatch operation. Alternatively, an unlatch operation can be inferred if none is explicitly specified, and only indicated as illegal if the inferred unlatch operation would need to be in a different execution set from the latch operation. In some examples, a data processing graph is considered to be illegal if a latch operation and its corresponding unlatch operation are not both present in the same execution set.

4 State Machine for Control Graphs

In the process of preparing a data processing graph for execution, the compiler/interpreter 120 also generates a control graph in a control graph generation procedure. In some implementations, generating a control graph includes generating executable code for performing the tasks corresponding to individual components and code corresponding to the various links among the components that determine flow of data and control among those tasks. This includes transfer of data and control among the hierarchy of execution sets discovered by the compiler/interpreter 120.

Part of generating such executable code includes generating, in some data structure representations, a corresponding control graph for each execution set, including any enable/suppress execution sets. Any nested execution sets within an execution set are treated as a single component representing that nested execution set for purposes of generating a control graph. The ports of this representative component correspond to ports of components within the nested execution set that are connected to links that cross the boundary of the nested execution set. The compiler/interpreter 120 will then use this control graph to generate control code. This generated control code effectively implements a state machine that controls execution at runtime. In particular, once execution begins, this generated control code controls when a component or a port transitions from one state to another of this state machine.

FIG. 12A shows an example of how the compiler/interpreter 120 combines first and second component pairs 1202, 1204 of a root execution set into a control graph 1206. In this example, the first component pair 1202 includes first and second components 1208, 1210 connected by respective collection data ports 1212, 1214. The second component pair 1204 includes and third and fourth components 1216, 1218 connected by respective scalar data ports 1220, 1222.

The compiler/interpreter 120 creates a control graph by adding a begin component 1224 and a finish component 1226 and connecting components to the begin and finish components 1224, 1226 as dictated by the topology of the data processing graph. The begin and finish components do not perform any computing tasks, but are used by the compiler/interpreter 120 to manage the control signals that will be used to begin execution of certain components and determine when all components in the execution set have finished execution.

To determine whether a particular component needs to be connected to a begin component 1224, the compiler/interpreter 120 inspects the inputs to that component to determine if it is not designated to begin executing based on an existing link to an upstream serial port, which, as described above, includes both control ports and scalar ports.

For example, if a component has no link to its control input port, there is the possibility that it will never begin executing since there would never be a control signal to tell it to start. On the other hand, even if there were no control input, it is possible, depending on the type of data input that a component has, for arrival of data to trigger execution of that component. For example, if a component has a scalar input port, then even in the absence of a control signal at its control input port, that component will still begin execution as soon as it sees data at its scalar input port. On the other hand, if a component only has a collection data input, then this will not happen. If such a component does not have a control input or scalar data input to trigger execution, it will need a connection to the begin component 1224.

In the context of FIG. 12A, the first component 1208 has neither a control input nor a scalar data input. Thus, there would be no way for the first component 1208 to begin execution by itself. Therefore, the first component 1208 must be linked to the begin component 1224. The third component 1216 likewise has neither a control input nor a scalar data input. Therefore, the third component 1216 must also be linked to the begin component 1224.

The fourth component 1218 has no control input. But it is connected to receive a scalar data input from the third component 1216. Therefore, it will begin execution upon receiving data through its input scalar port 1222. Thus, the fourth component 1218 does not require a connection to the begin component 1224.

The second component 1210 is configured to receive data from the first component 1208. However, this data is received at an input collection port 1214 and not at an input scalar port. As a result, the second component 1210, like the first, must also be connected to the begin component 1224.

The compiler/interpreter 120 also needs to identify which of the components will need to be connected to the finish component 1226.

In general, a component is connected to a finish component 1226 when it lacks either a control output link or a data output link (of any type). In the diagram on the left side of FIG. 12A, this condition is only satisfied by the second component 1210 and the fourth component 1218. Thus, as shown on the right side of FIG. 12A, only these two components are connected to the finish component 1226.

Figure 12B:
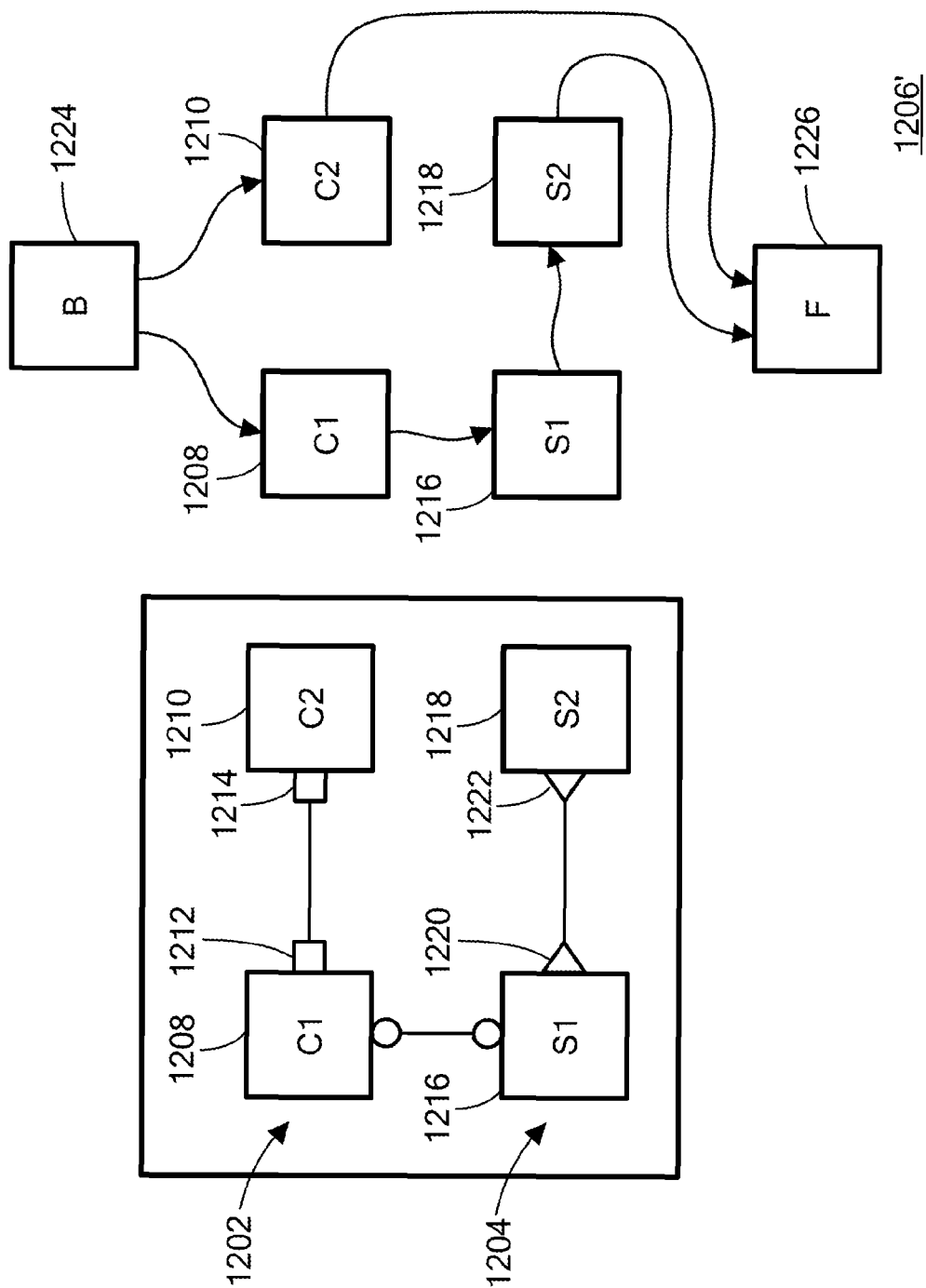

FIG. 12B is similar to FIG. 12A except that a control link exists between the first component 1208 and the third component 1216 on the left side of the figure. Consistent with the rules, it is no longer necessary to connect the third component 1216 to the begin component 1224 in the resulting alternative control graph 1206'.

The control graph effectively defines a distributed state machine in which the components and their serial ports transition from one state to another in response to transitions occurring for upstream components and serial ports. In general, an upstream component will transition from one state to another, causing its output serial ports to transition, which causes linked serial input ports of downstream components to transition, which causes those downstream components to transition, and so on. One example of a specific type of state machine for achieving this behavior is described in greater detail below, with reference to state transition diagrams for components and their serial ports.

To provide control over the transitions of the state machine, the compiler/interpreter 120 grafts additional control code to the code for performing the task represented by a particular component. As used herein, "grafting" means pre-pending, appending, or both pre-pending and appending control code. Control code that is pre-pended is referred to herein as "prologue" code, whereas control code that is appended is referred to as "epilogue" code. Prologue code for a component is executed before the component executes its task. Epilogue code for a component is executed after the component 610A has completed executing its task.

The grafted control code inspects stored state information, such as the value of an accumulator (e.g., a counter counting down to a value indicating that inputs are ready for invoking a component) or the state of a flag (e.g., a flag set to a value indicating that a component has been suppressed), to determine whether or not to cause one or more downstream components to execute their respective tasks.

In one embodiment, prologue code monitors the states of upstream output serial ports and updates the states of the input serial ports of the component and the state of the component, while the epilogue code updates the component's output serial ports after the component completes carrying out its task.

In another embodiment, instead of the prologue code of a downstream component monitoring upstream output serial ports, the epilogue code of an upstream component updates the collective state of downstream input serial ports and monitors that collective state to trigger execution of the prologue code of the downstream component at an appropriate time, such as when a counter initialized to the number of input serial ports reaches zero. Alternatively, instead of a counter counting down from a number of input ports (or counting up to a number of input ports), another form of accumulator can be used to store the state information for triggering a component, such as a bitmap that stores bits representing states of different ports of different components.

As a result of this grafted control code, completion of tasks automatically leads to automatic execution of other tasks in a manner consistent with the data control dependencies that are represented by the control graph and in a manner that permits concurrent operation of multiple components and the use of conditional control logic to control, based on the occurrence of a collection of one or more upstream logical states, when execution of particular components begins and ends.

Figure 13A:
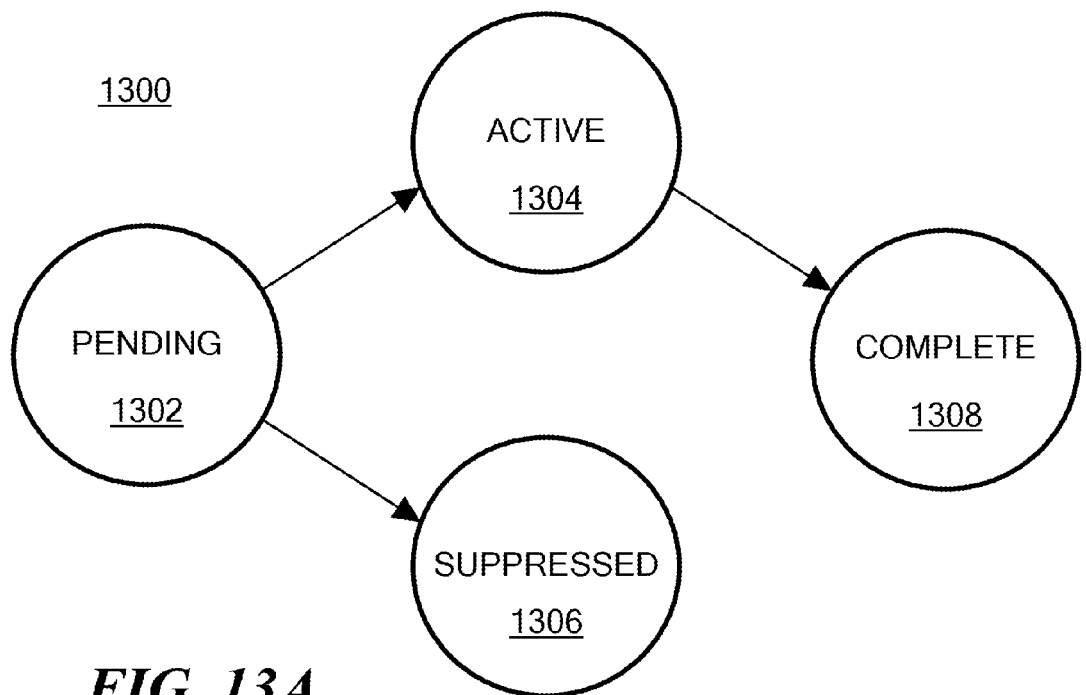
FIGS. 13A-13B are state transition diagrams for an example execution state machine.
Figure 13B:
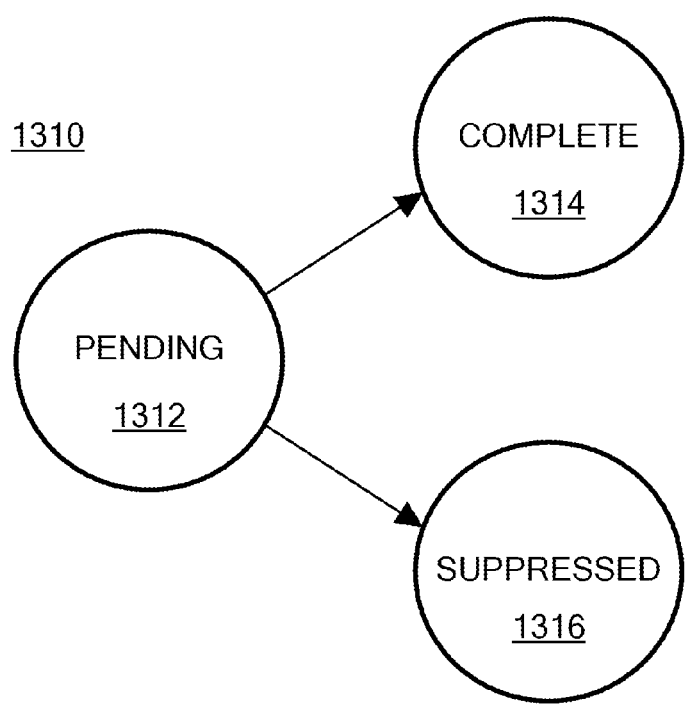

FIGS. 13A and 13B show state transition diagrams for an example state machine that could be used for components (state transition diagram 1300 of FIG. 13A) and for their serial ports (state transition diagram 1310 of FIG. 13B). The state transition diagrams are similar except that since the active state 1304 is associated with ongoing execution, and since only components and not ports carry out execution, only a component can be in the active state 1304.

All of the possible states of both state transition diagrams will be described, as well as the conditions necessary to follow each transition between the states, referring as needed to FIGS. 13A and 13B. All of the input and output ports referred to in this description of the state transition diagrams are serial ports, since the components in the control graph only need to link serial ports (and not collection ports). A particular component in a control graph can be in one of the four logical states of the state transition diagram 1300. The first state is the pending state 1302. This is the state a component starts in when the execution set associated with the control graph begins execution. A component remains in the pending state 1302 if any input port of the component is in the pending state 1312. If a component happens to have no input ports, it starts in the pending state 1302 but is immediately eligible to transition out of the pending state 1302.

From the pending state 1302, the component can transition into either the active state 1304 or the suppressed state 1306.

A component transitions into the active state 1304 if none if its input ports is in the pending state 1312 and not all of its input ports are in the suppressed state 1316 (i.e., at least one input port is in the complete state 1314). Ports are "required" by default, but may be marked as "optional". An optional port can be left unconnected to another port without causing an error (though there may be a warning). Any optional port left unconnected is automatically in the complete state 1314. A component remains in the active state 1304 as long as it is still executing its task. While a component is in the active state 1304, its output ports can transition, either at different times or together, from the pending state 1312 to either the complete state 1314 or the suppressed state 1316. Upon completing execution of its task, the component transitions from the active state 1304 into the complete state 1308.

A component transitions into the complete state 1308 if the component's task has finished executing, and all of its output ports are "resolved," i.e., no longer pending.

A component is in the suppressed state 1306 if the component's prologue has triggered a transition to the suppressed state 1306, either due to custom control logic, due to all of its input ports being suppressed, due to suppression of at least one of its required input ports, or due to an unhandled error in the component. All of the component's output ports also resolve to the suppressed state 1316 to propagate the suppression downstream.

For ports, the state transition rules depend on whether the port is an input port or an output port.

The initial state for a port is the pending state 1312. An input port generally follows the state of an upstream output port to which it is linked. Thus, when an upstream output port transitions, the input port linked to that output port in the control graph transitions into the same state. An output port remains pending until the component, during its active state, determines what state the output port should resolve to.

As noted above, input ports follow upstream output ports to which they are linked. Thus, for an input port linked to a single upstream output port, that input port transitions into the complete state 1314 when the upstream output port to which it is linked transitions into the complete state 1314. If an input port is linked to multiple upstream output ports through multiple links, then the input port transitions into the complete state 1314 after at least one of its upstream output ports transitions to the complete state 1314. Otherwise, if all upstream output ports transition to the suppressed state 1316, then the input port transitions to the suppressed state 1316. Some embodiments use other logic different from this default "OR logic" to determine whether to transition an input port to the complete state 1314 or suppressed state 1316 (e.g., "AND logic" where an input port transitions to the complete state 1314 only if all upstream output ports are in the complete state 1314). If a component's input data port resolves to the complete state 1314, a data element is ready for that component to process. If a component's output data port resolves to the complete state 1314, a data element is ready to send downstream from that component.

Consistent with the rule that input ports follow the state of upstream output ports to which they are linked, an input port resolves to the suppressed state 1316 when an upstream output port to which it is linked resolves to the suppressed state 1316. An output port resolves to the suppressed state 1316 either because an active component computed a result that determined the output port should be suppressed, or to enable suppression from an upstream suppressed component to propagate downstream, or if there was an unhandled error in the component. In some embodiments, it is possible for the compiler to optimize execution by suppressing a tree of downstream components having a root at a suppressed component without having to have suppression propagate downstream on a component-by-component basis.

In other embodiments, any of a variety of alternative state machines could be used, in which links between collection ports could also be included in the control graph. In some such embodiments, a state transition diagram for collection ports could include an active state in addition to the pending, complete, and suppressed states, such as in the state transition diagram 1300 for components. A collection port is in the active state when it is producing (as an output port) data, or consuming (as an input port) data. For an input collection port, for example, the active state could be triggered when the first data element is produced upstream, as soon as it is determined that not all input ports will be suppressed. In some embodiments, there is no suppressed state for collection ports. The transition rules followed by components in a control graph that includes state transitions for collection ports may handle the active state for an input collection port in the same manner that the complete state was handled for an input scalar port or control port.

5 Computing Platform

Referring back to FIG. 1, instances of components of the data processing graph are spawned as tasks in the context of executing a data processing graph and are generally executed in multiple of the computing nodes 152 of the computing platform 150. As discussed in more detail below, the controller 140 provides supervisory control aspects of the scheduling and locus of execution of those tasks in order to achieve performance goals for the system, for example, related to allocation of computation load, reduction in communication or input/output overhead, and use of memory resources.

Generally, after translation by the compiler/interpreter 120, the overall computation is expressed as a task-based specification 130 in terms of procedures of a target language that can be executed by the computing platform 150. These procedures make use of primitives, such as "spawn" and "wait" and may include within them or call the work procedures specified by a programmer for components in the high-level (e.g., graph-based) program specification 110.

In many instances, each instance of a component is implemented as a task, with some tasks implementing a single instance of a single component, some tasks implementing a single instance of multiple components of an execution set, and some tasks implementing successive instances of a component. The particular mapping from components and their instances depends on the particular design of the compiler/interpreter, such that the resulting execution remains consistent with the semantic definition of the computation.

Generally, tasks in the runtime environment are arranged hierarchically, for example, with one top-level task spawning multiple tasks, for example, one for each of the top-level components of the data processing graph. Similarly, computation of an execution set may have one task for processing an entire collection, with multiple (i.e., many) sub-tasks each being used to process an element of the collection.

In the runtime environment, each task that has been spawned may be in one of a set of possible states. When first spawned, a task is in a Spawned state prior to being initially executed. When executing, it is in an Executing state. From time to time, the task may be in a Suspended state. For example, in certain implementations, a scheduler may put a task into a Suspended state when it has exceeded quantum of processor utilization, is waiting for a resource, etc. In some implementations, execution of tasks is not preempted, and a task must relinquish control. There are three Suspended substrates: Runnable, Blocked, and Done. A task is Runnable, for example, if it relinquished control before it had completed its computation. A task is Done when it has completed its processing, for example, prior to the parent task retrieving a return value of that task. A task is Blocked if it is waiting for an event external to that task, for example, completion of another task (e.g, because it has used the "wait for" primitive), or availability of a data record (e.g., blocking one execution of an in.read( ) or out.write( ) function).

Referring again to FIG. 1, each computing node 152 has one or more processing engines 154. In at least some implementations, each processing engine is associated with a single operating system process executing on the computing node 150. Depending on the characteristics of the computing node, it may be efficient to execute multiple processing engines on a single computing node. For example, the computing node may be a server computer with multiple separate processors, or the server computer may have a single processor that has multiple processor cores, or there may be a combination of multiple processors with multiple cores. In any case, executing multiple processing engines may be more efficient than using only a single processing engine on a computing node 152.

One example of a processing engine is hosted in the context of a virtual machine. One type of virtual machine is a Java Virtual Machine (JVM), which provides an environment within which tasks specified in compiled form as Java Bytecode may be executed. But other forms of processing engines, which may or may not use a virtual machine architecture can be used.

Figure 14:
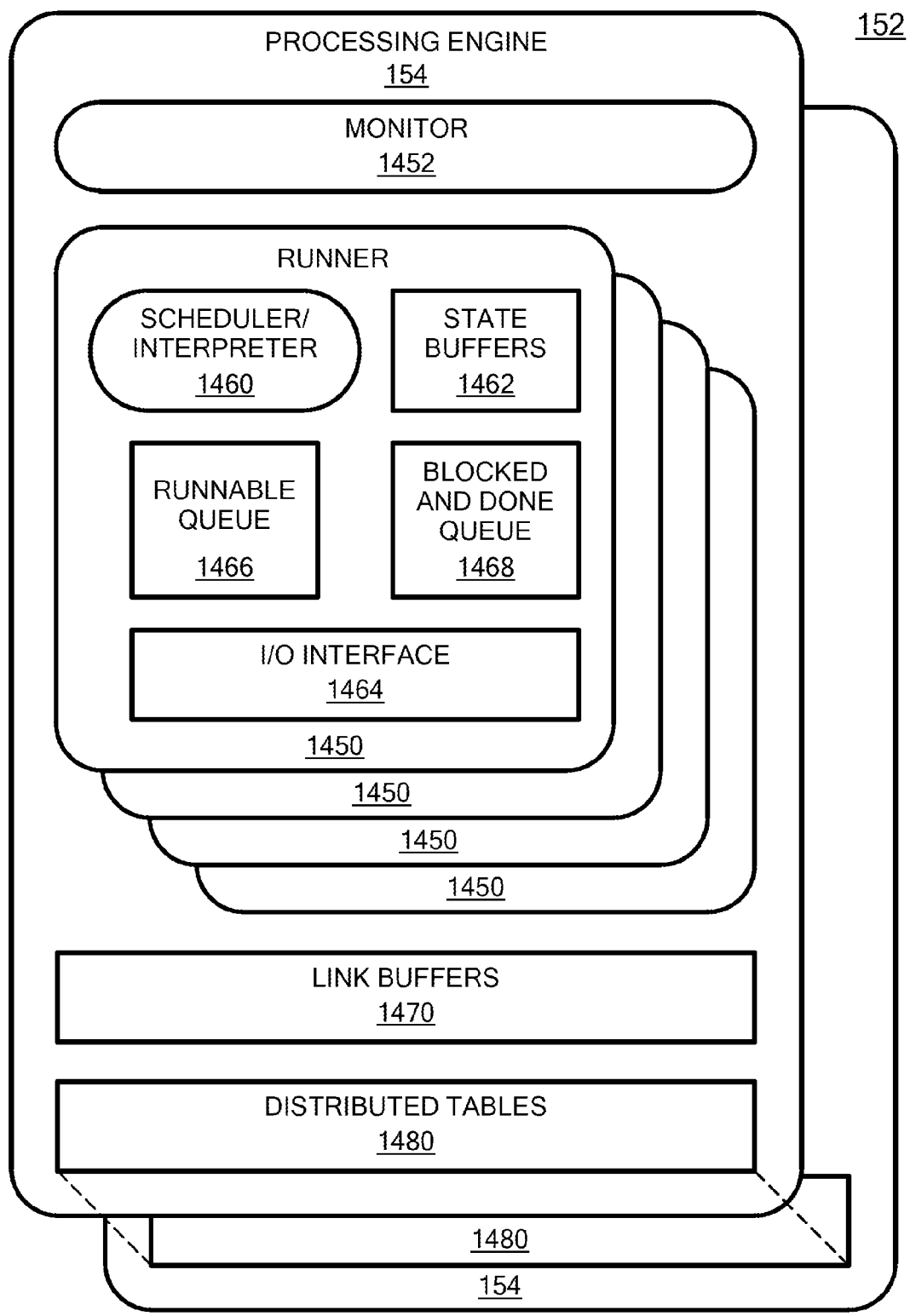
FIG. 14 is a diagram of a set of processing engines.

Referring to FIG. 14, each of the processing engines 154 of a computing node 152 has one or more runners 1450. Each runner 1450 uses one or more processes or process threads to execute runnable tasks. In some implementations, each runner has an associated process thread, although such an association of runners with threads is not necessary. At any time, each runner is executing at most one runnable tasks of the computation. Each runner has a separate runnable queue 1466. Each runnable task of the computation is in one runnable queue 1466 of a runner 1450 of the system. Each runner 1450 has a scheduler/interpreter 1460, which monitors a currently running task, and when that task changes state to Done, Blocked, or Suspended, selects another task from the runnable queue 1466 and executes it. Tasks are associated with runners, and a runner's tasks that are not runnable are maintained outside the runnable queue 1466, for example as illustrated in a blocked and done queue 1468.

Runners 1450 may be created when the processing engines 154 are initialized, for example, creating a preconfigured number of runners per engine. As discussed below, in some implementations, runners may be added or remove from processing engines, and processing engines themselves may be added and removed from the computing platform 150, even during execution of a data processing graph. For an initial description below, however, we assume that the number of processing engines and the number of runners within each processing engine remain constant.

As an example, processing for a data processing graph begins with execution of the Main procedure in a top-level task. For example, the task-based controller 140 instructs one of the computing nodes communicating with a monitor 1452 of one of the processing engines 1450 to begin execution of the Main procedure. In this example, the monitor 1452 places a task for executing the Main procedure in the runnable queue 1466 of one of the processing engines. In this example, the runner is idle (i.e., there are no other tasks running at the time, and no other runnable tasks in the runnable queue), so the scheduler/interpreter 1460 of that runner retrieves the task from the runnable queue and begins execution of the task. When the procedure is expressed in a language that needs to be interpreted, the scheduler/interpreter 1460 interprets successive statements of the procedure.

In this example, the first statement of the Main procedure creates (i.e., allocates memory for) link buffers 1470 for links supporting the flow of unordered collections, which in this example includes unordered unbounded buffers buffer1, buffer2, and buffer3. Various approaches are used for creating this type of inter-component link, and for managing associated computing resources for these links (including link buffers 1470), which include any link whose upstream port is a collection port. In some examples, the link buffers 1470 include buffers for output collection ports representing the source of a collection and separate buffers for input collection ports representing the destination of a collection. These buffers may be allocated at runtime just before processing on the collection begins, and deallocated (i.e., freeing the memory used for the buffer) just after processing on the collection ends. In this example, these link buffers 1470 are allocated in a memory of the processing engine 154 in which the runner of the task is executing. In general, the memory in which the buffers are created are in semiconductor random access memory (RAM), although in some implementations, other storage devices such as disks may be used to store at least some of the buffer data. Note that in other approaches, the buffer may be local to the runner itself. In practice, if the processing engine 154 is implemented as an operating system process, the buffers are created as memory regions in the address space of that process. Therefore, direct hardware address based access to the buffers is limited to instructions that execute within that process. Note that in such an approach, at least some synchronization and access control to the buffers, for example, using locks or semaphores, may be needed if multiple runners will be able to read or write to the buffers. In approaches in which each runner is implemented as a single thread within an operating system process, the buffers may be associated with a particular runner, and all access may be restricted to that runner, thereby avoiding potential contention from multiple threads. In the discussion below, we assume that the buffers are accessible from any runner in the processing engine, and that suitable access control is implemented to allow such shared access.

The next steps of the Main process involve a spawn or forall primitive that is invoked by the Main process. In general, at least by default, spawning of a child task or tasks causes those tasks to be initially formed in the same runner as the parent. For example, the spawn Work_Read_External_Data task is spawned on the same runner. To the extent that the task is accessing external data, the task may make use of an I/O interface 1464 to that external data. For example, that interface may consist of an open connection to an external database, an endpoint of a network data connection etc. Such I/O interfaces may be bound to the particular runner and therefore the task using that interface may be required to access the interface only from that runner, as is discussed further below in the context of potential migration of tasks between runners. In this example we assume that the task fills buffer1 in a manner that is reasonably metered and does not "overwhelm" the system, for example, by causing buffer1 to grow beyond the capacity of the processing engine. Approaches to aspects of control, for example, to avoid congestion or exhaustion of resources are also discussed below.

Concurrent with execution of the Work_Read_External_Data task, the forall Work_A causes tasks to be spawned for each of the records that are read from buffer1. In particular, the "forall" primitive causes multiple instances of a task identified by an argument of the primitive to be executed, where the number of instances is determined typically by the number of data elements received at runtime, and where the location at which they are executed and the order in which they are invoked can be left unrestricted by the compiler for later determination at runtime. As discussed above, by default these tasks are also created on the same runner 1450, and again absent other controls, are spawned as fast as data is available from buffer1. Tasks for Work_B, and Work_Write_External_Data are similarly created on the same runner.

Note that the task-based specification makes use of "forall" primitives without explicitly specifying how the runtime controller will implement the distribution of the tasks to cause all the data to be processed. As discussed above, one approach that may be used by the runtime controller is to spawn separate tasks on the same computing node, and then relying on migration features to cause the tasks to execute on separate nodes thereby balancing load. Other approaches may be used in which a "forall" primitive causes tasks to be executed directly on multiple nodes. In the case of a cursor defining an index-based subset of rows of a table of the in-memory database, an implementation of a cursor forall primitive may cause the cursor to be split into parts each associated with records stored on different nodes, and tasks are spawned for the separate parts of the cursor on the different nodes thereby causing locality of the processing and the data storage. But it should be understood that a wide range of approaches may be implemented in one or more embodiments of a runtime controller and distributed computing platform to execute the "forall" primitives used in the task-based specification 130 that is the output of the compiler 120. In some examples, the selection of approach may be dependent on runtime decisions, for example, based on number of records, distribution of data over computing nodes, load on the nodes, etc. In any case, the approach used to implement the "forall" primitives are not necessarily known to the developer of the data processing graph or to the designer of the compiler.

A feature of the system is that tasks may be transferred between runners after they are created. Very generally, one way such transfer of tasks is implemented by a "stealing" or "pull" mechanism in which a runner that is idle, or at least lightly loaded, causes tasks from another runner to be transferred to it. Although a variety of criteria may be used, a number of runnable tasks in a runner's runnable queue 1466 may determine if that runner should seek tasks to steal from other runners based on a local criterion such as whether fewer than a threshold number of tasks is in its runnable queue. In some implementations a more global decision process may be used to rebalance the task queues on multiple runners, but the overall effect is similar.

In at least some embodiments, stealing of a task from one runner to another does not necessarily involve transferring all the data for that task. For example, only data accessible in a current execution "frame" (e.g., the data for the local and global variables accessible from the current program scope, for example, a current subroutine call) are packaged along with a reference back to the tasks "home" runner. This data is sufficient to make a runnable copy of the task at the destination runner of the migration and an entry in the destination runnable queue is ready for execution in that runner.

When a migrated runner completes execution, or exhausts the data transferred to the runner by returning from the program scope for which the local variables were available, the task is transferred back to the home runner, where the data for the task is merged and the task is once again made runnable at its home runner.

Note that during transfer of a task within a single processing engine, the communication between runners may be through local memory (i.e., avoiding disk or network communication) thereby consuming relatively few resources. In implementations that permit stealing and migration between processing engines, while in transit from one runner to another the task consumes relatively few resources, for example, primarily consuming communication resources between processing engines rather than computation resources. Furthermore, the latency of such communication is relatively insignificant because the home and destination runners are presumed to be busy computing during the transfer, the home runner because its runnable queue was heavily populated and therefore unlikely to empty and the destination runner because the stealing is done in anticipation of the runnable queue at the destination being emptied.

In the example of execution for the tasks associated with the computations illustrated in FIGS. 2A-B, the task stealing mechanism distributed the load for the computation across the runners of one or more processing engines. Note however, that certain data access is limited to a particular runner (or possibly to a particular processing engine). For example, as outlined above, the data for buffer2 may be accessible by a single runner (or possibly a group of runners), and yet a Work_A task, which may need to write to buffer2 may have been stolen by a runner that is not able to write to buffer2. In such cases when a task needs to take an action that must be executed at a different runner than where that task is currently executing, the task is migrated to a suitable runner in a "migration" or "push" manner.

In at least some examples, the computation platform 150 supports a global data storage for a set of (key,value) pairs for global variables. This data storage may be distributed across memory (e.g., RAM, or disk) on multiple of the computing nodes (or processing engines). The name space of keys is global in the sense that a specification of a key has the same meaning at all computing nodes 152 and their runners 1450. The values for these variables persist while tasks are instantiated, execute, and terminate, thereby providing a way of passing information between tasks without requiring that such information is passed from one task to another via a common parent task. As discussed below access to values according to keys is controlled so that the use and updating of the values does not cause conflicts among tasks. In some examples, tasks gain exclusive access to a particular (key,value) pair for some or all of their execution.

In general, storage for the (key,value) pairs is distributed, and any particular (key,value) pair is associated with a particular computing node 152. For example, the (key,value) pair is stored in a distributed table storage 1480 at that computing node. In some implementations, the spawn primitive permits specification of a key and a mapping of the associated variable into a local variable of the tasks. When a key is specified, the task that is spawns gains exclusive access to the key for the duration of its execution. Prior to execution beginning, the value is passed from the storage into the local context of the task, and after execution completes, the value in the local context is passed back to the global storage. If a spawn primitive specifies a key that is in use by another executing task, this newly spawned task is blocked until it can gain exclusive access to the key. In some implementations, each computing node can determined the home node for a particular key, and when a task is requested to be spawned, that request is handled by the computing node at which the (key,value) pair is resident, and the execution of the task will initially begin at that node. In alternative embodiments, other approaches for gaining similar exclusive access to such global shared (key, value) pairs does not necessarily involve initiating tasks in the same location as the storage, for example, by communicating requests for exclusive access and later communicating releases of the exclusive access with the updated value of for the key. Tasks can create new (key, value) pairs, which by default are stored on the node at which the task is running when new (key, value) pair is created.

One use of global state variables is for aggregation during execution of a function of successive records of a collection. For example, rather than the value being single item, the global storage maintains a window of values that are assigned to the key. Therefore, in the programming model, a value can be added to the history maintained in association with the key, and a function of the previously added values can be provided. The window of values may be defined according to a number of items (i.e., the last 100 items), by a time window (i.e., the items added in the last 10 minutes, for example, defined by the times the values were added or by explicit time stamps provided with each value as it is added). Note that the programming model does not require explicit deletion of old values that fall outside the window, with the definition of the window allowing implementations to perform such deletion automatically. The programming model includes a number of primitives for creating such window based keyed global variables (e.g., defining the nature and extent of the window), adding values to the key, and computing functions (e.g., maximum, average, number of distinct values, etc.) of the window of values. Some primitives combine the addition of a new value for the key and returning of the function of the window (e.g., add the new value to the key and return the average of the last 100 values added).

In at least some examples, the global storage also includes shared record-oriented data that is accessed via identifiers referred to as handles. For example, a handle may identify a source or a sink of data records, or as another example, a handle may identify a particular record in a data set. Generally, the handles are typed in that a handle point provides a way of accessing data and also provides a definition of the structure of the data being accessed. For example, a handle may have associated with it the field (column) structure of a data record.

In at least some examples, the global storage (e.g., in memory of the computing nodes) includes a table storage for one or more tables of rows of typed data, with the tables or particular records of tables again being accessed via identifiers referred to as handles. A table's row type may be a hierarchical record type, with vectors, vectors of records, etc. In some examples, a table may have one or more indices that provide hash- or B-tree (ordered) access to rows, and a cursor can be created from a table, an index, or an index and key value(s). Rows may be inserted, updated, or deleted individually. In order to support transaction processing, a task may lock one or multiple rows of one or more tables, for example, for read or update access during processing for a component of the data processing graph. Tables can be treated as collections for data parallel operations, for example, as sources or destinations of data in a data processing graph. In general, the tables are indexed, and a subset of rows of a table may selected based on the index yielding a cursor, and that cursor is then used to provide the selected rows as a data source. In some examples, further primitives are available to a task for actions such as splitting a cursor and estimating a number of records associated with a handle. When a cursor is provided as a source of data for an execution set, the cursor may be split into parts each providing some of the rows of the table to a corresponding instance of the execution set, thereby providing parallelism and with appropriate splitting of the cursor enabling execution on nodes at which the rows are stored. A data table may also be accessed by a task implementing a transaction such that modifications of the data table are maintained so as not to be visible outside a task until those modifications are committed explicitly by a task. In some examples, such transaction support may be implemented by locking one or more rows of a table, while in other examples, more complex approaches involving multiple versions of rows, may be implemented to provide greater potential concurrency than may be provided solely using locks.

Files, data flows, and in memory tables are all examples of what are referred to as collections. A reader task reads records from a collection, and a writer task writes records to a collection. Some tasks are both readers and writers.

As introduced above, flows representing collections may be implemented in the runtime system using in-memory buffers. Alternatively, any form of storage can be used in various implementations, including tables within a database, or a distributed storage system. In some implementations, an in-memory distributed database is used. In some implementations, the compiler implements such flows using in-memory tables in a manner that is not necessarily exposed to the developer of the data processing graph. For example, the compiler may cause an upstream component to populate rows of a table, and a downstream component to read previously populated rows, thereby implementing an unordered data flow. The runtime controller may invoke multiple instances of a task corresponding to an execution set to process the driving data elements from an upstream collection port by retrieving the data elements from the storage in a different order than they were received into the storage, and in a manner that prevents certain forms of blocking. For example, the instances of the task can be invoked without blocking invocation of any of the instances by any particular other instance (i.e., until after any particular other instance completes processing one or more data elements).

In general, a record in a collection may have a handle prior to the data in that record being first written. For example, a table may be set up as the destination of an indexed set of records, and individual records may have handles even before the data for those records are written.

6 Implementations

The approach described above can be implemented, for example, using a programmable computing system executing suitable software instructions or it can be implemented in suitable hardware such as a field-programmable gate array (FPGA) or in some hybrid form. For example, in a programmed approach the software may include procedures in one or more computer programs that execute on one or more programmed or programmable computing system (which may be of various architectures such as distributed, client/server, or grid) each including at least one processor, at least one data storage system (including volatile and/or non-volatile memory and/or storage elements), at least one user interface (for receiving input using at least one input device or port, and for providing output using at least one output device or port). The software may include one or more modules of a larger program, for example, that provides services related to the design, configuration, and execution of data processing graphs. The modules of the program (e.g., components of a data processing graph) can be implemented as data structures or other organized data conforming to a data model stored in a data repository.

The software may be stored in non-transitory form, such as being embodied in a volatile or non-volatile storage medium, or any other non-transitory medium, using a physical property of the medium (e.g., surface pits and lands, magnetic domains, or electrical charge) for a period of time (e.g., the time between refresh periods of a dynamic memory device such as a dynamic RAM). In preparation for loading the instructions, the software may be provided on a tangible, non-transitory medium, such as a CD-ROM or other computer-readable medium (e.g., readable by a general or special purpose computing system or device), or may be delivered (e.g., encoded in a propagated signal) over a communication medium of a network to a tangible, non-transitory medium of a computing system where it is executed. Some or all of the processing may be performed on a special purpose computer, or using special-purpose hardware, such as coprocessors or field-programmable gate arrays (FPGAs) or dedicated, application-specific integrated circuits (ASICs). The processing may be implemented in a distributed manner in which different parts of the computation specified by the software are performed by different computing elements. Each such computer program is preferably stored on or downloaded to a computer-readable storage medium (e.g., solid state memory or media, or magnetic or optical media) of a storage device accessible by a general or special purpose programmable computer, for configuring and operating the computer when the storage device medium is read by the computer to perform the processing described herein. The inventive system may also be considered to be implemented as a tangible, non-transitory medium, configured with a computer program, where the medium so configured causes a computer to operate in a specific and predefined manner to perform one or more of the processing steps described herein.

A number of embodiments of the invention have been described. Nevertheless, it is to be understood that the foregoing description is intended to illustrate and not to limit the scope of the invention, which is defined by the scope of the following claims. Accordingly, other embodiments are also within the scope of the following claims. For example, various modifications may be made without departing from the scope of the invention. Additionally, some of the steps described above may be order independent, and thus can be performed in an order different from that described.

What is claimed is:

1. A method including:
   storing a graph-based program specification including a plurality of components corresponding to tasks and links between ports of the components, at least some of the plurality of components each having at least one of:
   (1) at least one input port for receiving a collection of data elements to be processed by a corresponding task, or
   (2) at least one collection type output port for providing a collection of data elements to be processed by a task corresponding to a component linked to the collection type output port; and executing a program specified by the graph-based program specification, the executing including:
- receiving two or more data elements of a particular collection of data elements in a first order via a link connected to a collection type output port of a first component of the plurality of components and an input port of a second component of the plurality of components, and
- invoking a plurality of instances of a task corresponding to the second component, including dynamically instantiating each instance of the plurality of instances to begin processing a particular received data element of the particular collection of data elements, and including invoking the instances in a second order, without blocking invocation of any of the instances for any particular instance to begin or complete processing one or more data elements,
- wherein the second order is different from the first order.

2. The method of claim 1 wherein invoking one or more instances of the task corresponding to the second component includes invoking a plurality of instances of the task corresponding to the second component.

3. The method of claim 2 wherein invoking the plurality of instances of the task corresponding to the second component includes invoking a plurality of sequentially executing instances of the task corresponding to the second component.

4. The method of claim 2 wherein invoking a plurality of instances of the task corresponding to the second component includes invoking a plurality of concurrently executing instances of the task corresponding to the second component.

5. The method of claim 4 wherein each instance of the task of the plurality of instances of the task corresponding to the second component corresponds to a different, non-overlapping subset of the particular collection of data elements.

6. The method of claim 5 wherein each different, non-overlapping subset of the particular collection of data includes a single data element.

7. The method of claim 1 wherein the input port of the second component is a collection type input port for receiving a collection of data elements to be processed by the task corresponding to the second component, and invoking one or more instances of the task corresponding to the second component includes invoking a single instance of the task corresponding to the second component.

8. The method of claim 7 wherein the single instance of the task corresponding to the second component processes the data elements of the particular collection of data elements iteratively.

9. The method of claim 1 wherein the executing further includes generating an output including a first number of data elements that is the same as a second number of data elements in the particular collection.

10. The method of claim 9 wherein the two or more data elements of the particular collection of data elements are received into a first storage, and the executing further includes providing the output to a second storage in a third order that is independent of the first order of the particular collection of data elements.

11. The method of claim 1 wherein the executing further includes generating an output including a first number of data elements that is different from a second number of data elements in the particular collection.

12. The method of claim 1 wherein at least some of the plurality of components each have
- at least one scalar type input port for receiving a single data element to be processed by a corresponding task, and
- at least one scalar type output port for providing a single data element to be processed by a task corresponding to a component linked to the scalar type output port; and executing the program specified by the graph-based program specification further includes:
- receiving a single data element at a scalar type input port of a third component of the plurality of components from a scalar type output port of a fourth component of the plurality of components via a link connecting the scalar type output port to the scalar type input port; and
- invoking an instance of a task corresponding to the third component in response to receiving the single data element at the scalar type input port.

13. The method of claim 12 wherein executing the program specified by the graph-based program specification further includes preventing invocation of the task corresponding to the third component until after the single data element is received at the scalar type input port.

14. The method of claim 12 wherein executing the program specified by the graph-based program specification further includes preventing invocation of tasks corresponding to components depending, both directly and indirectly, from the third component until after the single data element is received at the scalar type input port.

15. The method of claim 1 further including determining the presence of the link connected to the collection type output port of the first component and the input port of the second component, the presence of said link signaling that the data elements within the first collection can be reordered.

16. A non-transitory computer-readable medium having software stored thereon, the software including instructions for causing a computing system to:
- store a graph-based program specification including a plurality of components corresponding to tasks and links between ports of the components, at least some of the plurality of components each having at least one of:
  - (1) at least one input port for receiving a collection of data elements to be processed by a corresponding task, or
  - (2) at least one collection output port for providing a collection of data elements to be processed by a task corresponding to a component linked to the collection output port; and
- execute a program specified by the graph-based program specification, the executing including
  - receiving two or more data elements of a particular collection of data elements in a first order via a link connected to a collection type output port of a first component of the plurality of components and an input port of a second component of the plurality of components, and
  - invoking a plurality of instances of a task corresponding to the second component, including dynamically instantiating each instance of the plurality of instances to begin processing a particular data element of the particular collection of data elements, and including invoking the instances in a second order, without blocking invocation of any of the instances for any particular instance to begin or complete processing one or more data elements, wherein the second order is different from the first order.

17. The non-transitory computer-readable medium of claim 16 wherein invoking one or more instances of the task corresponding to the second component includes invoking a plurality of instances of the task corresponding to the second component.

18. The non-transitory computer-readable medium of claim 17 wherein invoking the plurality of instances of the task corresponding to the second component includes invoking a plurality of sequentially executing instances of the task corresponding to the second component.

19. The non-transitory computer-readable medium of claim 17 wherein invoking a plurality of instances of the task corresponding to the second component includes invoking a plurality of concurrently executing instances of the task corresponding to the second component.

20. The non-transitory computer-readable medium of claim 19 wherein each instance of the task of the plurality of instances of the task corresponding to the second component corresponds to a different, non-overlapping subset of the particular collection of data elements.

21. The non-transitory computer-readable medium of claim 20 wherein each different, non-overlapping subset of the particular collection of data includes a single data element.

22. The non-transitory computer-readable medium of claim 16 wherein the input port of the second component is a collection type input port for receiving a collection of data elements to be processed by the task corresponding to the second component, and invoking one or more instances of the task corresponding to the second component includes invoking a single instance of the task corresponding to the second component.

23. The non-transitory computer-readable medium of claim 22 wherein the single instance of the task corresponding to the second component processes the data elements of the particular collection of data elements iteratively.

24. The non-transitory computer-readable medium of claim 16 wherein the executing further includes generating an output including a first number of data elements that is the same as a second number of data elements in the particular collection.

25. The non-transitory computer-readable medium of claim 24 wherein the two or more data elements of the particular collection of data elements are received into a first storage, and the executing further includes providing the output to a second storage in a third order that is independent of the first order of the particular collection of data elements.

26. The non-transitory computer-readable medium of claim 16 wherein the executing further includes generating an output including a first number of data elements that is different from a second number of data elements in the particular collection.

27. The non-transitory computer-readable medium of claim 16 wherein
at least some of the plurality of components each have
at least one scalar type input port for receiving a single data element to be processed by a corresponding task, and
at least one scalar type output port for providing a single data element to be processed by a task corresponding to a component linked to the scalar type output port; and
executing the program specified by the graph-based program specification further includes:
receiving a single data element at a scalar type input port of a third component of the plurality of components from a scalar type output port of a fourth component of the plurality of components via a link connecting the scalar type output port to the scalar type input port; and
invoking an instance of a task corresponding to the third component in response to receiving the single data element at the scalar type input port.

28. The non-transitory computer-readable medium of claim 27 wherein executing the program specified by the graph-based program specification further includes preventing invocation of the task corresponding to the third component until after the single data element is received at the scalar type input port.

29. The non-transitory computer-readable medium of claim 27 wherein executing the program specified by the graph-based program specification further includes preventing invocation of tasks corresponding to components depending, both directly and indirectly, from the third component until after the single data element is received at the scalar type input port.

30. The non-transitory computer-readable medium of claim 16 further including determining the presence of the link connected to the collection type output port of the first component and the input port of the second component, the presence of said link signaling that the data elements within the first collection can be reordered.

31. A computing system including:
a data storage system for storing a graph-based program specification including a plurality of components corresponding to tasks and links between ports of the components, at least some of the plurality of components each having at least one of:
(1) at least one input port for receiving a collection of data elements to be processed by a corresponding task, or
(2) at least one collection output port for providing a collection of data elements to be processed by a task corresponding to a component linked to the collection output port; and
at least one processor configured to execute a program specified by the graph-based program specification, the executing including
receiving two or more data elements of a particular collection of data elements in a first order via a link connected to a collection type output port of a first component of the plurality of components and an input port of a second component of the plurality of components, and
invoking a plurality of instances of a task corresponding to the second component, including dynamically instantiating each instance of the plurality of instances to begin processing a particular received data element of the particular collection of data elements, and including invoking the instances in a second order, without blocking invocation of any of the instances for any particular instance to begin or complete processing one or more data elements,
wherein the second order is different from the first order.

32. The computing system of claim 31 wherein invoking one or more instances of the task corresponding to the second component includes invoking a plurality of instances of the task corresponding to the second component.

33. The computing system of claim 32 wherein invoking the plurality of instances of the task corresponding to the second component includes invoking a plurality of sequentially executing instances of the task corresponding to the second component.

34. The computing system of claim 32 wherein invoking a plurality of instances of the task corresponding to the second component includes invoking a plurality of concurrently executing instances of the task corresponding to the second component.

35. The computing system of claim 34 wherein each instance of the task of the plurality of instances of the task corresponding to the second component corresponds to a different, non-overlapping subset of the particular collection of data elements.

36. The computing system of claim 35 wherein each different, non-overlapping subset of the particular collection of data includes a single data element.

37. The computing system of claim 31 wherein the input port of the second component is a collection type input port for receiving a collection of data elements to be processed by the task corresponding to the second component, and invoking one or more instances of the task corresponding to the second component includes invoking a single instance of the task corresponding to the second component.

38. The computing system of claim 37 wherein the single instance of the task corresponding to the second component processes the data elements of the particular collection of data elements iteratively.

39. The computing system of claim 31 wherein the executing further includes generating an output including a first number of data elements that is the same as a second number of data elements in the particular collection.

40. The computing system of claim 39 wherein the two or more data elements of the particular collection of data elements are received into a first storage, and the executing further includes providing the output to a second storage in a third order that is independent of the first order of the particular collection of data elements.

41. The computing system of claim 31 wherein the executing further includes generating an output including a first number of data elements that is different from a second number of data elements in the particular collection.

42. The computing system of claim 31 wherein at least some of the plurality of components each have
at least one scalar type input port for receiving a single data element to be processed by a corresponding task, and
at least one scalar type output port for providing a single data element to be processed by a task corresponding to a component linked to the scalar type output port; and
executing the program specified by the graph-based program specification further includes:
receiving a single data element at a scalar type input port of a third component of the plurality of components from a scalar type output port of a fourth component of the plurality of components via a link connecting the scalar type output port to the scalar type input port; and
invoking an instance of a task corresponding to the third component in response to receiving the single data element at the scalar type input port.

43. The computing system of claim 42 wherein executing the program specified by the graph-based program specification further includes preventing invocation of the task corresponding to the third component until after the single data element is received at the scalar type input port.

44. The computing system of claim 42 wherein executing the program specified by the graph-based program specification further includes preventing invocation of tasks corresponding to components depending, both directly and indirectly, from the third component until after the single data element is received at the scalar type input port.

45. The computing system of claim 31 further including determining the presence of the link connected to the collection type output port of the first component and the input port of the second component, the presence of said link signaling that the data elements within the first collection can be reordered.

46. A computing system including:
means for storing a graph-based program specification including a plurality of components corresponding to tasks and links between ports of the components, at least some of the plurality of components each having at least one of:
(1) at least one input port for receiving a collection of data elements to be processed by a corresponding task, or
(2) at least one collection output port for providing a collection of data elements to be processed by a task corresponding to a component linked to the collection output port; and
means for executing a program specified by the graph, the executing including
receiving two or more data elements of a particular collection of data elements in a first order via a link connected to a collection type output port of a first component of the plurality of components and an input port of a second component of the plurality of components, and
invoking a plurality of instances of a task corresponding to the second component, including dynamically instantiating each instance of the plurality of instances to begin processing a particular received data element of the particular collection of data elements, and including invoking the instances in a second order, without blocking invocation of any of the instances for any particular instance to begin or complete processing one or more data elements,
wherein the second order is different from the first order.

* * * * *